United States Patent
Shenefiel et al.

(10) Patent No.: US 11,783,076 B2
(45) Date of Patent: *Oct. 10, 2023

(54) UNSTRUCTURED DATA SENSITIVITY INFERENCE FOR FILE MOVEMENT TRACKING IN A NETWORK

(71) Applicant: Cisco Technology, Inc., San Jose, CA (US)

(72) Inventors: Chris Allen Shenefiel, Williamsburg, VA (US); Robert Waitman, Suffern, NY (US); David McGrew, Poolesville, MD (US); Blake Harrell Anderson, Chapel Hill, NC (US)

(73) Assignee: Cisco Technology, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/860,217

(22) Filed: Jul. 8, 2022

(65) Prior Publication Data

US 2022/0350913 A1    Nov. 3, 2022

Related U.S. Application Data

(63) Continuation of application No. 16/196,035, filed on Nov. 20, 2018, now Pat. No. 11,403,411.

(51) Int. Cl.
*G06F 21/62* (2013.01)
*G06N 20/00* (2019.01)

(52) U.S. Cl.
CPC ......... *G06F 21/6218* (2013.01); *G06N 20/00* (2019.01)

(58) Field of Classification Search
CPC .. G06F 21/6218; G06F 21/554; G06F 21/577; G06F 2221/2107; G06N 20/00; H04L 63/1425
See application file for complete search history.

(56) References Cited

U.S. PATENT DOCUMENTS

| | | | | |
|---|---|---|---|---|
| 8,621,233 | B1 * | 12/2013 | Manadhata | G06F 21/56 709/224 |
| 8,640,251 | B1 * | 1/2014 | Lee | G06F 16/164 707/786 |
| 9,338,012 | B1 | 5/2016 | Naik | |
| 9,641,544 | B1 * | 5/2017 | Treat | H04L 43/04 |
| 10,868,834 | B2 * | 12/2020 | Anderson | H04L 63/10 |
| 2006/0037076 | A1 | 2/2006 | Roy | |

(Continued)

OTHER PUBLICATIONS

BigID—Redefining Personal Data Protection & Privacy; https://bigid.com; pp. 1-4.

(Continued)

*Primary Examiner* — Han Yang
(74) *Attorney, Agent, or Firm* — BEHMKE INNOVATION GROUP LLC; James M. Behmke; Jonathon P. Western

(57) ABSTRACT

In one embodiment, a traffic analysis service that monitors a network obtains file metadata regarding an electronic file. The traffic analysis service determines a sensitivity score for the electronic file based on the file metadata. The traffic analysis service detects the electronic file within traffic in the network. The traffic analysis service causes performance of a mitigation action regarding the detection of the electronic file within the traffic, based on the sensitivity score of the electronic file.

20 Claims, 20 Drawing Sheets

(56) References Cited

U.S. PATENT DOCUMENTS

| | | | |
|---|---|---|---|
| 2010/0024037 A1 | 1/2010 | Grzymala-Busse | |
| 2010/0088305 A1 | 4/2010 | Fournier | |
| 2010/0162395 A1 | 6/2010 | Kennedy | |
| 2013/0081142 A1* | 3/2013 | McDougal | G06F 21/577 726/24 |
| 2013/0340031 A1* | 12/2013 | Amit | H04W 12/37 726/1 |
| 2015/0254555 A1 | 9/2015 | Williams, Jr. | |
| 2016/0098390 A1 | 4/2016 | Kitajima | |
| 2016/0154801 A1 | 6/2016 | Li | |
| 2018/0336323 A1* | 11/2018 | Hanusiak | G06F 21/121 |
| 2019/0138727 A1 | 5/2019 | Dontov | |
| 2019/0347429 A1* | 11/2019 | Jean-Louis | G06F 16/353 |
| 2019/0349403 A1 | 11/2019 | Anderson | |
| 2020/0204590 A1 | 6/2020 | Whitham | |
| 2020/0304528 A1 | 9/2020 | Ackerman | |
| 2020/0320418 A1 | 10/2020 | Aminian | |

OTHER PUBLICATIONS

Wu et al. "Text Document Classification and Pattern Recognition," 2009 International Conference on Advances in Social Network Analysis and Mining, Athens, 2009, pp. 405-410.

European Search Report dated Feb. 4, 2020 in connection with European U.S. Appl. No. 19/208,619.

Paraskevi Dimou, "Encrypted Traffic Analysis", Nov. 2019, European Union Agency for Cybersecurity (ENISA), 55 pages (Year: 2019).

Konstantin Bottinger, "Detecting Fingerprinted Data in TLS Traffic", Apr. 2015, ASIA CCS '15: Proceedings of the $10^{th}$ ACM Symposium on Information, Computer and Communications Security, https://doi.org/10.1145/2714576.2714595, 6 pages (Year: 2015).

Blake Anderson, "Deciphering malware's use of TLS (without decryption}", Aug. 31, 2017, J Comput Virol Hack Tech (2018) 14:195-211, https://doi.org/10.007/s11416-017-0306-6, 17 pages. (Year: 2017).

* cited by examiner

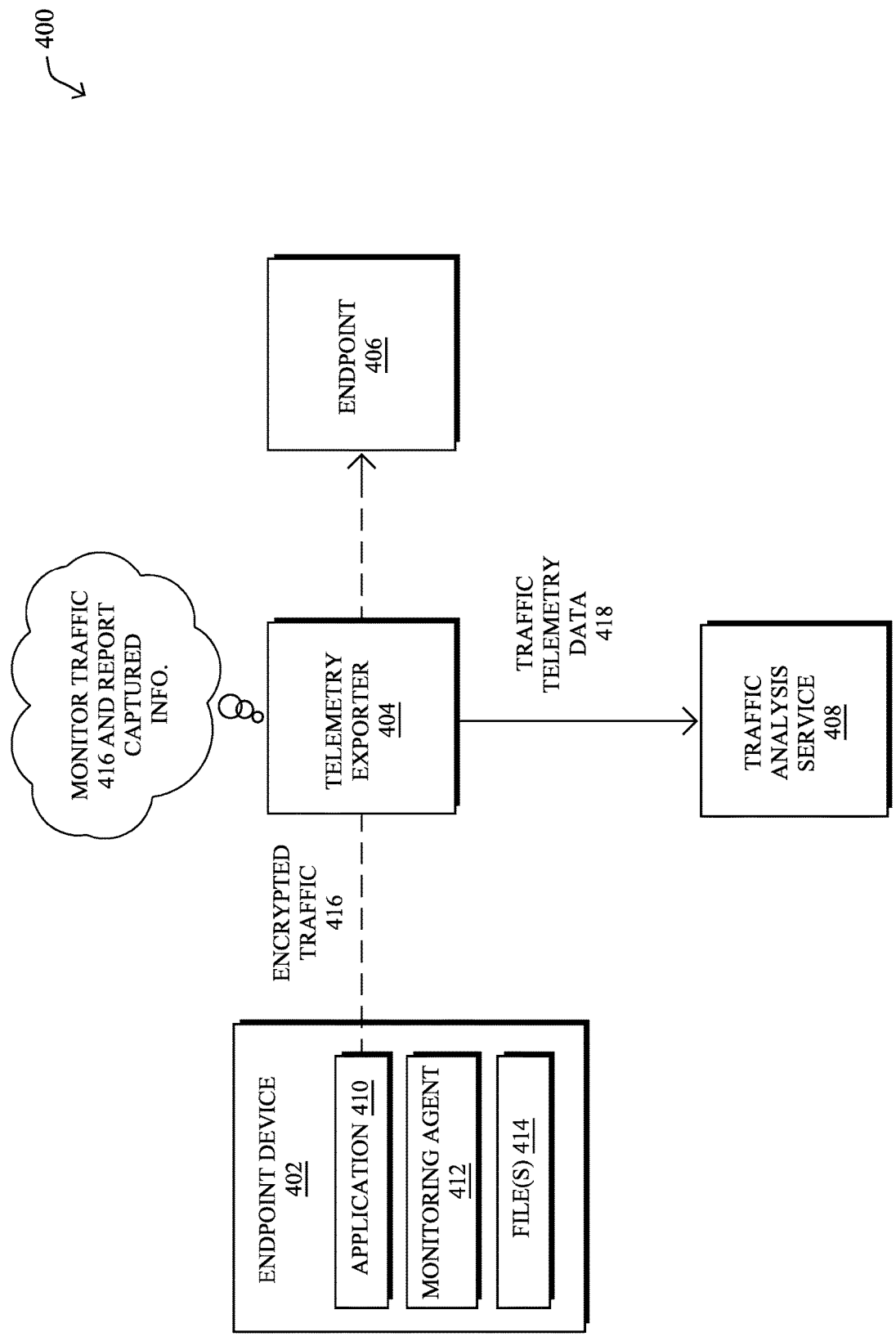

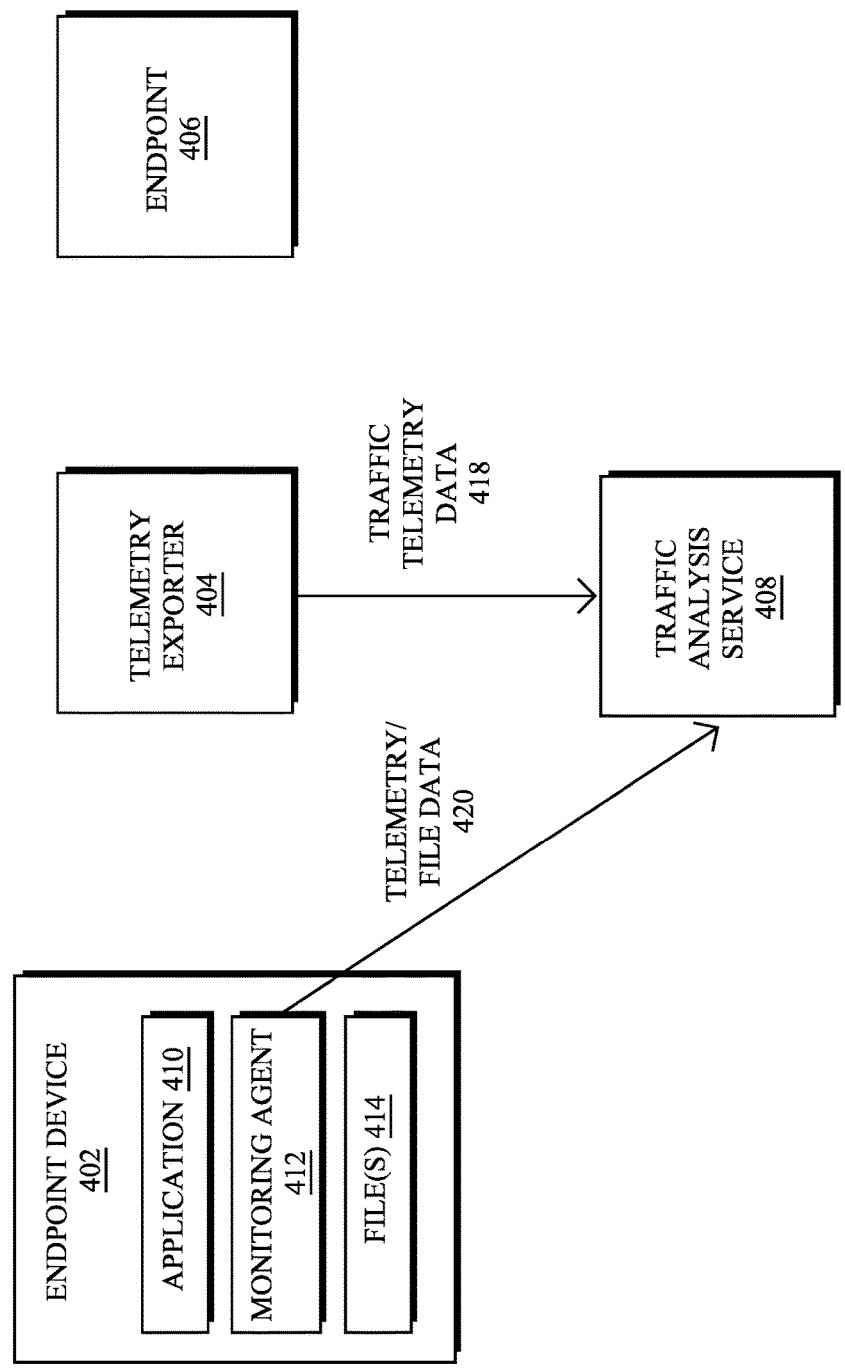

UNSTRUCTURED DATA SENSITIVITY INFERENCE FOR FILE MOVEMENT TRACKING IN A NETWORK

RELATED APPLICATION

This application is a continuation of U.S. patent application Ser. No. 16/196,035, filed on Nov. 20, 2018, entitled UNSTRUCTURED DATA SENSITIVITY INFERENCE FOR FILE MOVEMENT TRACKING IN A NETWORK, by Chris Allen Shenefiel, et al., the entire contents of which are incorporated by reference herein.

TECHNICAL FIELD

The present disclosure relates generally to computer networks, and, more particularly, to unstructured data sensitivity inference for file movement tracking in a network.

BACKGROUND

The sensitivity of electronic files may vary greatly across an organization. For example, certain files may contain publicly available information that can be freely shared. On the opposite end of the spectrum, however, are files that contain information that should be kept internal to the organization and may even be restricted from access by certain individuals within the organization. For example, consider the case of a spreadsheet that includes the Social Security numbers of the employees of a company. In such a case, the spreadsheet should never be shared externally (e.g., uploaded to Dropbox, etc.), nor should it be shared outside of the human resources (HR) department of the company. Further examples of information that should have restricted access may include, but are not limited to, trade secrets, classified information, insider trading information, medical records, and the like.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 4A-4C illustrate an example of correlating endpoint and network views to detect data exfiltration in encrypted data;

DESCRIPTION OF EXAMPLE EMBODIMENTS

Overview

Figure 1A:
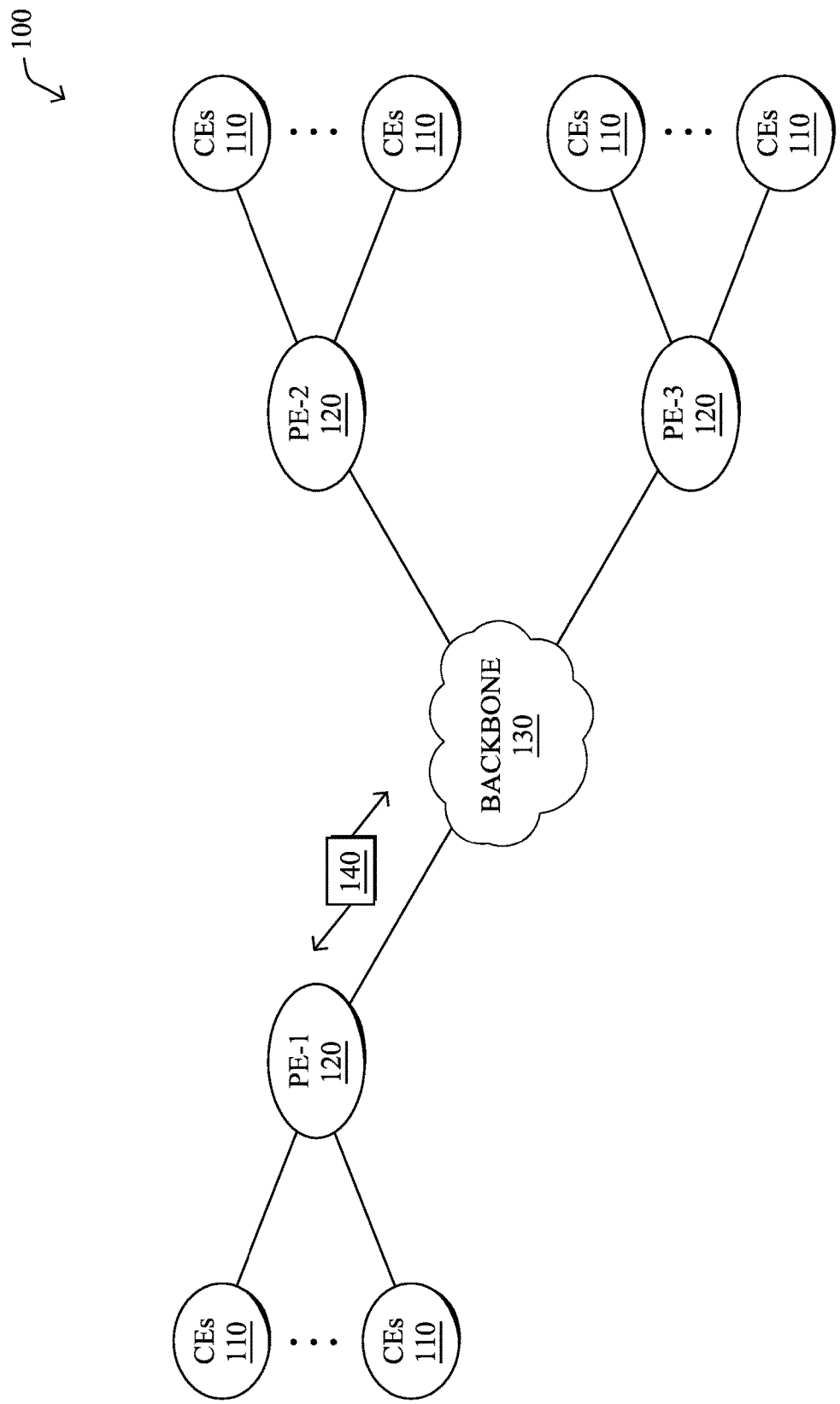
FIGS. 1A-1B illustrate an example communication network.

According to one or more embodiments of the disclosure, a traffic analysis service that monitors a network obtains file metadata regarding an electronic file. The traffic analysis service determines a sensitivity score for the electronic file based on the file metadata. The traffic analysis service detects the electronic file within traffic in the network. The traffic analysis service causes performance of a mitigation action regarding the detection of the electronic file within the traffic, based on the sensitivity score of the electronic file.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different service providers), with potentially a backup link (e.g., a 3G/4G/LTE connection). A site of type B may itself be of different types:

2a.) Site Type B1: a site connected to the network using two MPLS VPN links (e.g., from different service providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
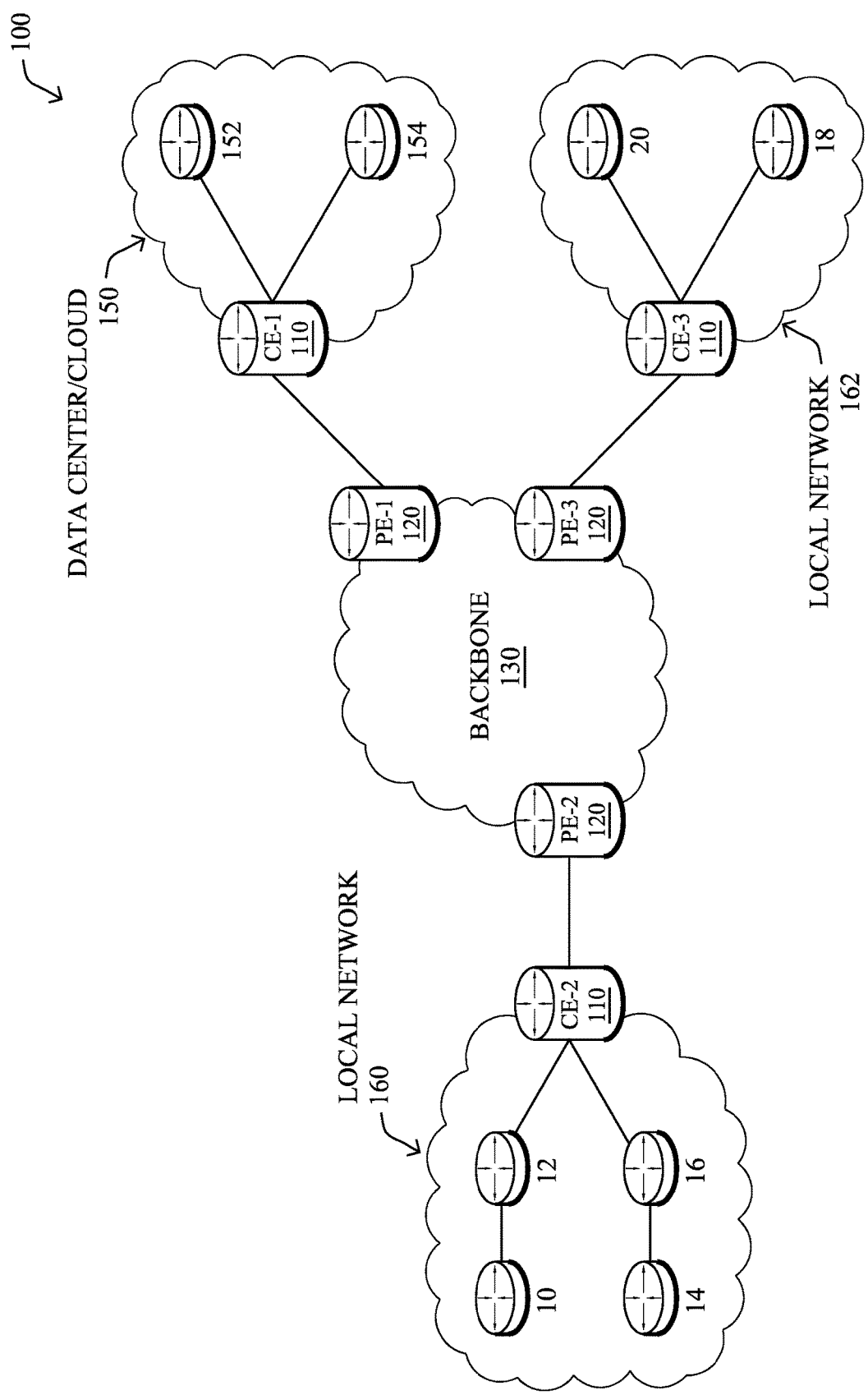

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
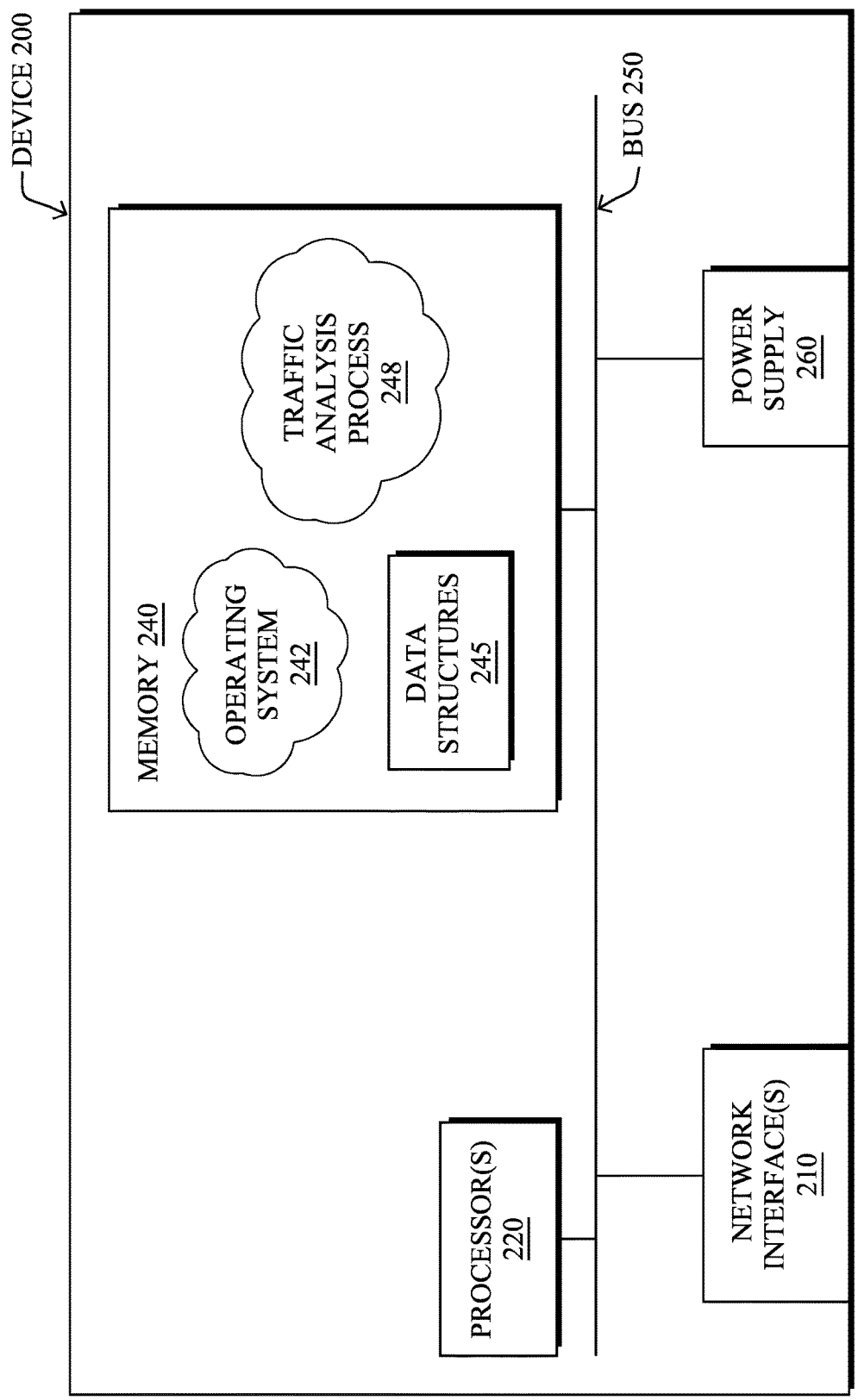
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a traffic analysis process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, traffic analysis process 248 may execute one or more machine learning-based classifiers to classify encrypted traffic in the network (and its originating application) for any number of purposes. In one embodiment, traffic analysis process 248 may assess captured telemetry data regarding one or more traffic flows, to determine whether a given traffic flow or set of flows are caused by malware in the network, such as a particular family of malware applications. Example forms of traffic that can be caused by malware may include, but are not limited to, traffic flows reporting exfiltrated data to a remote entity, spyware or ransomware-related flows, command and control (C2) traffic that oversees the operation of the deployed malware, traffic that is part of a network attack, such as a zero day attack or denial of service (DoS) attack, combinations thereof, or the like. In further embodiments, traffic analysis process 248 may classify the gathered telemetry data to detect other anomalous behaviors (e.g., malfunctioning devices, misconfigured devices, etc.), traffic pattern changes (e.g., a group of hosts begin sending significantly more or less traffic), or the like.

Traffic analysis process 248 may employ any number of machine learning techniques, to classify the gathered telemetry data. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function is a function of the number of misclassified points. The learning process then operates by adjusting the parameters a,b,c such that the number of misclassified points is minimal. After this optimization/learning phase, traffic analysis 248 can use the model M to classify new data points, such as information regarding new traffic flows in the network. Often, M is a statistical model, and the cost function is inversely proportional to the likelihood of M, given the input data.

In various embodiments, traffic analysis process 248 may employ one or more supervised, unsupervised, or semi-supervised machine learning models. Generally, supervised learning entails the use of a training set of data, as noted above, that is used to train the model to apply labels to the input data. For example, the training data may include sample telemetry data that is "normal," or "malware-generated." On the other end of the spectrum are unsupervised techniques that do not require a training set of labels. Notably, while a supervised learning model may look for previously seen attack patterns that have been labeled as such, an unsupervised model may instead look to whether there are sudden changes in the behavior of the network traffic. Semi-supervised learning models take a middle ground approach that uses a greatly reduced set of labeled training data.

Example machine learning techniques that traffic analysis process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of traffic flows that are incorrectly classified as malware-generated, anomalous, etc. Conversely, the false negatives of the model may refer to the number of traffic flows that the model incorrectly classifies as normal, when actually malware-generated, anomalous, etc. True negatives and positives may refer to the number of traffic flows that the model correctly classifies as normal or malware-generated, etc., respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In some cases, traffic analysis process 248 may assess the captured telemetry data on a per-flow basis. In other embodiments, traffic analysis 248 may assess telemetry data for a plurality of traffic flows based on any number of different conditions. For example, traffic flows may be grouped based on their sources, destinations, temporal characteristics (e.g., flows that occur around the same time, etc.), combinations thereof, or based on any other set of flow characteristics.

Figure 3:
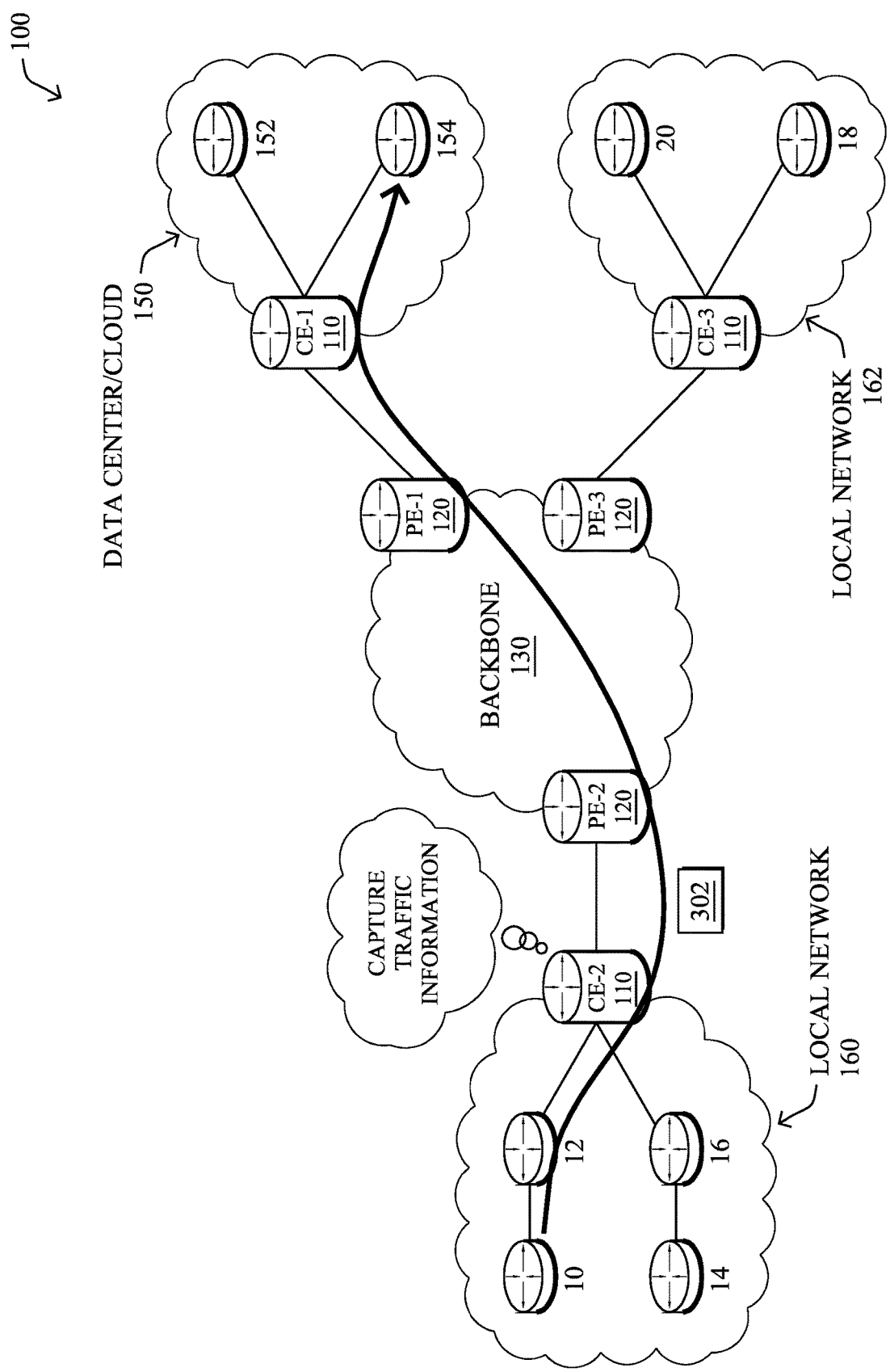
FIG. 3 illustrates an example of a device capturing traffic information.

As shown in FIG. 3, various mechanisms can be leveraged to capture information about traffic in a network, such as telemetry data regarding a traffic flow. For example, consider the case in which client node 10 initiates a traffic flow with remote server 154 that includes any number of packets 302. Any number of networking devices along the path of the flow may analyze and assess packet 302, to capture telemetry data regarding the traffic flow. For example, as shown, consider the case of edge router CE-2 through which the traffic between node 10 and server 154 flows.

In some embodiments, a networking device may analyze packet headers, to capture feature information about the traffic flow. For example, router CE-2 may capture the source address and/or port of host node 10, the destination address and/or port of server 154, the protocol(s) used by packet 302, or other header information by analyzing the header of a packet 302. Example captured features may include, but are not limited to, Transport Layer Security (TLS) information (e.g., from a TLS handshake), such as the ciphersuite offered, user agent, TLS extensions (e.g., type of encryption used, the encryption key exchange mechanism, the encryption authentication type, etc.), HTTP information (e.g., uniform resource indicator (URI), etc.), Domain Name System (DNS) information, or any other data features that can be extracted from the observed traffic flow(s).

In further embodiments, the device may also assess the payload of the packet to capture information about the traffic flow. For example, router CE-2 or another device may perform deep packet inspection (DPI) on one or more of packets 302, to assess the contents of the packet. Doing so may, for example, yield additional information that can be used to determine the application associated with the traffic flow (e.g., packets 302 were sent by a web browser of node 10, packets 302 were sent by a videoconferencing application, etc.). However, as would be appreciated, a traffic flow may also be encrypted, thus preventing the device from assessing the actual payload of the packet. In such cases, the characteristics of the application can instead be inferred from the captured header information.

The networking device that captures the flow telemetry data may also compute any number of statistics or metrics regarding the traffic flow. For example, CE-2 may determine the start time, end time, duration, packet size(s), the distribution of bytes within a flow, etc., associated with the traffic flow by observing packets 302. In further examples, the capturing device may capture sequence of packet lengths and time (SPLT) data regarding the traffic flow, sequence of application lengths and time (SALT) data regarding the traffic flow, or byte distribution (BD) data regarding the traffic flow.

As noted above, data exfiltration represents one form of malicious activity in a network. In general, Data Loss Prevention (DLP) systems attempt to assign a classification score to documents indicating the sensitivity of documents in a network, and then identify when documents are transferred in a way that violates a pre-defined policy. For example, one policy violation may be uploading Personally Identifiable Information (PII), or a document containing PII, to a public folder of a cloud-based document sharing or collaboration service, where there are insufficient controls and measures to adequately protect the PII.

DLP systems typically rely on either an agent that has full access to the documents on the cloud-hosted application, or takes advantage of a TLS termination proxy to scan the contents as they traverse the network. In the case of an employee with malicious intent, it would be unlikely that they upload the documents to servers instrumented by the enterprise, and previous systems would therefore not be able to scan the document post-upload. In many countries, it is also against the law to decrypt traffic relating to a personal correspondence, which is what TLS-encrypted connections to mail or chat servers resemble. TLS termination proxies can also fail because of technical challenges.

The techniques herein allow for the identification of protected/sensitive files within encrypted network traffic, without the need for a TLS termination proxy or relying solely on instrumented clients and servers. In some aspects, an agent executed by a device hosting a sensitive file may collect and report information regarding the file (e.g., its file size, name, etc.) to a traffic analysis service. In further aspects, the traffic analysis service may assess encrypted traffic in the network using machine learning, to identify the HTTP message types within an encrypted tunnel, and post-process this information with a set of rules to extract the size of the transferred file. By correlating the learned file information from the endpoint to the encrypted traffic information, the traffic analysis service is able to determine whether the traffic includes the sensitive file. In turn, the service may apply any number of rules, to determine whether this is a security violation and, if so, cause the performance of any number of mitigation actions in the network (e.g., sending an alert to a system administrator, blocking the encrypted traffic, etc.).

In various embodiments, a set of known file characteristics (e.g., file sizes, etc.) of sensitive documents can be compared to file characteristics inferred from encrypted network traffic, to determine whether the traffic includes exfiltrated data. The set of known file characteristics to monitor can either come from an endpoint agent (e.g., Advanced Malware Protection (AMP) by Cisco Systems, Inc., etc.), or from a cloud monitoring application (e.g., Intelligent Context Aware Monitoring (iCAM) by Cisco Systems, Inc., etc.). In the case of an endpoint agent, a set of files can be directly associated with a specific endpoint. In the case of a cloud monitoring application, its logs can be used to associate a file with endpoints that downloaded that file. In either case, a set of file characteristics, such as file sizes and names, can be associated with a specific endpoint.

Figure 4C:
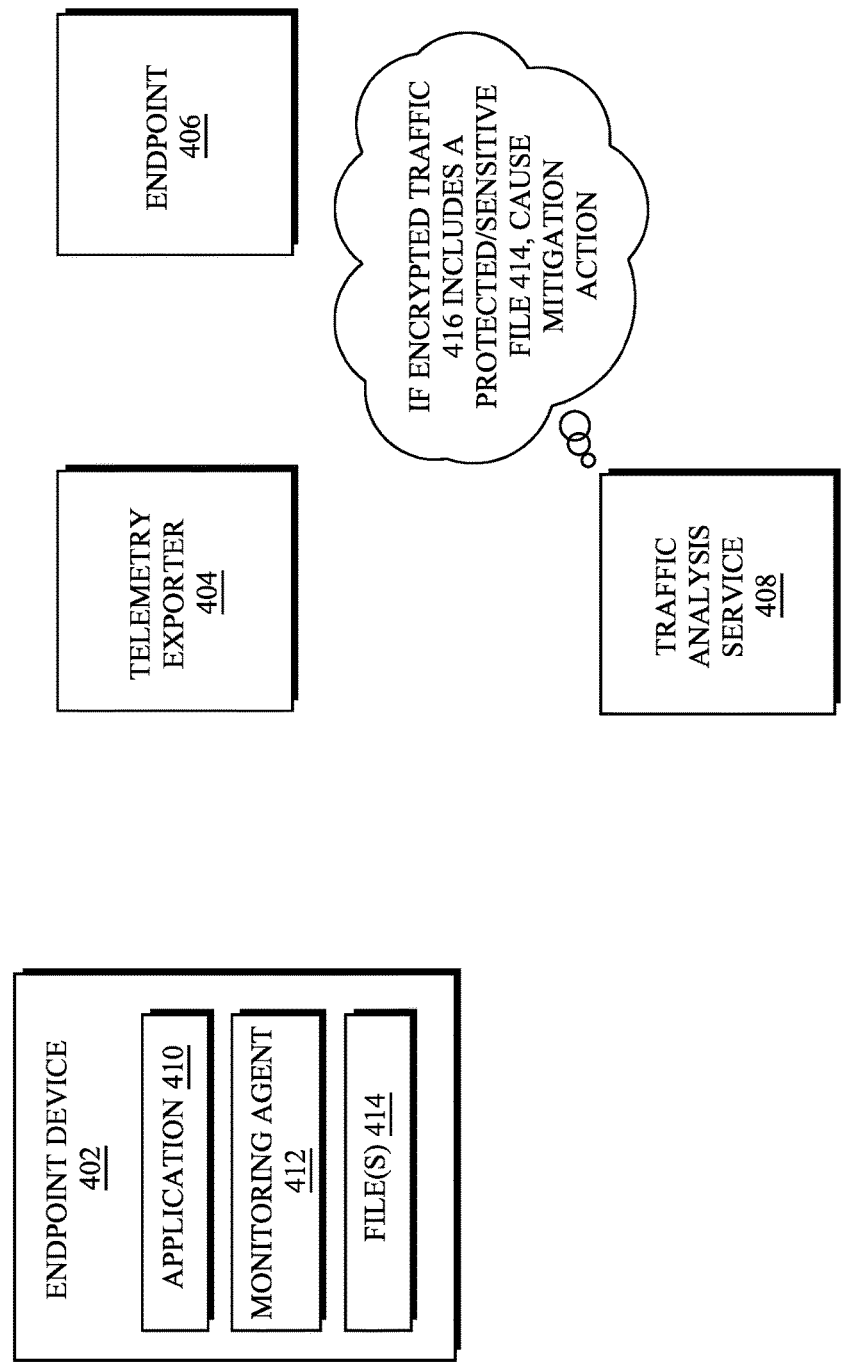

FIGS. 4A-4C illustrate an example of correlating endpoint and network views to detect data exfiltration in encrypted data, according to various embodiments. As shown in FIG. 4A, assume that a network 400 includes an endpoint device 402 that communicates with another remote endpoint 406. For example, in many cases, endpoint device 402 may be a client device that communicates with a remote server or service via network 400. In further cases, remote endpoint 406 may also be part of the network in which endpoint device 402 is located. More specifically, during operation, endpoint device 402 may execute an application 410 that generates and exchanges encrypted traffic 416 with endpoint 406 via network 400. In some cases, application 410 may send one or more local files 414 of endpoint 402 towards remote endpoint 406 via encrypted traffic 416.

Located along the network path between endpoint device 402 and endpoint 406 may be any number of telemetry exporters, such as telemetry exporter 404 shown. For example, telemetry exporter 404 may be a switch, router, firewall, server, network controller, or other networking equipment via which encrypted traffic 416 sent between endpoint device 402 end endpoint 406 flows. During operation, traffic telemetry exporter 404 may capture data regarding encrypted traffic 416, generate traffic telemetry data 418 based on the captured data, and send traffic telemetry data 418 to traffic analysis service 408 for assessment. For example, traffic telemetry data 418 may include Internet Protocol Flow Information Export (IPFIX) records and/or Netflow records regarding encrypted traffic 416.

In various embodiments, network 400 may also include a traffic analysis service 408 that is implemented by one or more devices in network 400 through the execution of traffic analysis process 248. For example, in some cases, traffic analysis service 408 may be implemented by one or more devices in the local network of endpoint device 402 (e.g., on the same device as telemetry exporter 404 or a device in communication therewith). However, in further cases, traffic analysis service 408 may be implemented as a cloud service that is in communication with telemetry exporter 404 and endpoint device 402, either directly or indirectly.

According to various embodiments, in addition to executing application 410, endpoint device 402 may also execute a monitoring agent 412 that monitors the local operations of endpoint device 402. More specifically, monitoring agent 412 may capture application telemetry data regarding the execution and operation of application 410 on endpoint device 402. For example, monitoring agent 412 may calculate a process hash fingerprint of application 410, may capture information regarding the libraries used by application 410, and/or may capture traffic information regarding encrypted traffic 416, such as size or timing information for the packets of encrypted traffic 416, or the like. In further embodiments, monitoring agent 412 may capture file characteristic information regarding one or more files 414 on endpoint 402, such as their sizes, Example monitoring applications that may be suitable for performing the tasks herein may include, but are not limited to, AnyConnect Network Visibility Module (NVM) by Cisco Systems, Inc., Advanced Malware Protection (AMP) by Cisco Systems, Inc., Application Performance Management by AppDynamics, certain monitoring functions of the resident operating system, and other suitable monitoring functions.

As shown in FIG. 4B, traffic analysis service 408 may also receive telemetry/file data 414 from monitoring agent 412. In some embodiments, monitoring agent 412 may supply telemetry/file data 414 to traffic analysis service 408 directly. In other embodiments, monitoring agent 412 may receive telemetry/file data 414 indirectly from endpoint device 402, such as via an application monitoring service in communication with monitoring agent 412. In addition, telemetry/file data 414 may be provided by monitoring agent 412 on either a push or pull basis. For example, in some cases, monitoring agent 412 may first send a request to monitoring agent 412 (either directly or indirectly) and, in response, monitoring agent 412 may send application telemetry/file data 414 to traffic analysis process 410. In general, telemetry/file data 414 may include information regarding the operations of application 410 (e.g., the packets generated by application 410, the hash of application 410, etc.) and/or file information for one or more files 414 located on endpoint device 402 (e.g., file size, file hash, file name, file location, etc.).

In FIG. 4C, in various embodiments, traffic analysis service 408 may correlate the file data 420 from monitoring agent 412 on endpoint 402 with the traffic telemetry data 418 captured by telemetry exporter 404 regarding encrypted traffic 416, to identify a specific one of file(s) 414 within encrypted traffic 416. As would be appreciated, the techniques herein can be performed on encrypted traffic 416 without actually decrypting encrypted traffic 416. This is in contrast to other approaches that require a proxy to act as a man-in-the-middle and actually encrypt the traffic.

In various embodiments, once the specific file 414 has been identified within encrypted traffic 416, traffic analysis service 408 may make a policy determination regarding the sending of the file to endpoint 406. Such a determination may be based on any or all of the following factors:

- A manually set protected/sensitive flag associated with the file 414.
- The name of the file 414 (e.g., "Account Information- .docx," etc.).
- The location of the file 414 on endpoint device 402 (e.g., in a folder flagged as protected/sensitive).
- A user associated with endpoint device 402.
- A user associated with endpoint device 406.
- A device type associated with endpoint device 402.
- A device type associated with endpoint device 406.

In some cases, traffic analysis service 408 may simply enforce a policy that the file 414 is restricted from being sent anywhere by endpoint device 402. However, more complex policies could limit the dissemination of the file to certain sets of users or devices. For example, traffic analysis service 408 may correlate the sensitivity score of the file with information about the type of endpoint 402, to customize the policy (e.g., the alarm threshold could be lowered for IoT devices or other host groups in the network). In another example, the file sensitivity score could be correlated with the user information (e.g., a CEO/CTO could have a more lenient policy because they are expected to share some sensitive documents with partners). In yet another example, traffic analysis service 408 may correlate the document type, user(s), and endpoint information to effect a given policy (e.g., an engineer with access to sensitive code repositories may have a reduced alarm threshold when transferring those repositories to external servers). In a further embodiment, another potential factor to compute the sensitivity score of the file may be whether malware is detected on endpoint 402. Notably, the presence of malware may greatly increase the chances that the file being sent via an encrypted session for malicious purposes, such as data exfiltration.

When traffic analysis service 408 determines that a policy violation has occurred (e.g., that a file is being exfiltrated), traffic analysis service 408 may cause any number of mitigation actions to occur in the network. In one embodiment, traffic analysis service 408 may block the encrypted connection. For example, in FIG. 4C, traffic analysis service 408 may cause the networking device(s) conveying encrypted traffic 416 between endpoint devices 402 and 406 to perform a mitigation action, such as blocking traffic 416, slowing traffic 416, redirecting traffic 416, etc. In another embodiment, traffic analysis service 408 may block all traffic involving either or both of endpoint devices 402 and 406. In a further embodiment, traffic analysis service 408 may generate and send an alert, such as a security alert to a network administrator or other expert.

To infer the file size from an encrypted tunnel possibly containing many multiplexed or pipelined HTTP requests and responses, traffic analysis service 408 may include one or more machine learning-based classifiers, in various embodiments. For example, in one embodiment, traffic analysis service 408 may comprise a multi-class classifier for both HTTP/1 and HTTP/2. In both cases, the feature set used for the classification may include any or all of the following: the TLS record lengths, times, types, etc. and/or the TCP flags, lengths, times, etc. of the window of packets or records surrounding the observed encrypted traffic. For HTTP/2, the classification label set may include the HTTP/2 frame types of the TLS encrypted frames, e.g., HEADERS, DATA, SETTINGS, etc. For HTTP/1, the classification label set may include: request, response, and body.

Training of the classifier(s) of traffic analysis service 408 may entail using a training dataset that includes both encrypted traffic patterns and the labeled, decrypted contents of the TLS connections. Notably, packet captures and their relevant key material can be used to construct a training dataset that can be used to train a classifier to infer and label the contents of encrypted traffic based on the observed features of the encrypted traffic. In turn, file transfers can be identified using the HTTP[S] inferences, thus avoiding mis-identifying non-file transfer events as potential file transfers.

Figure 5A:
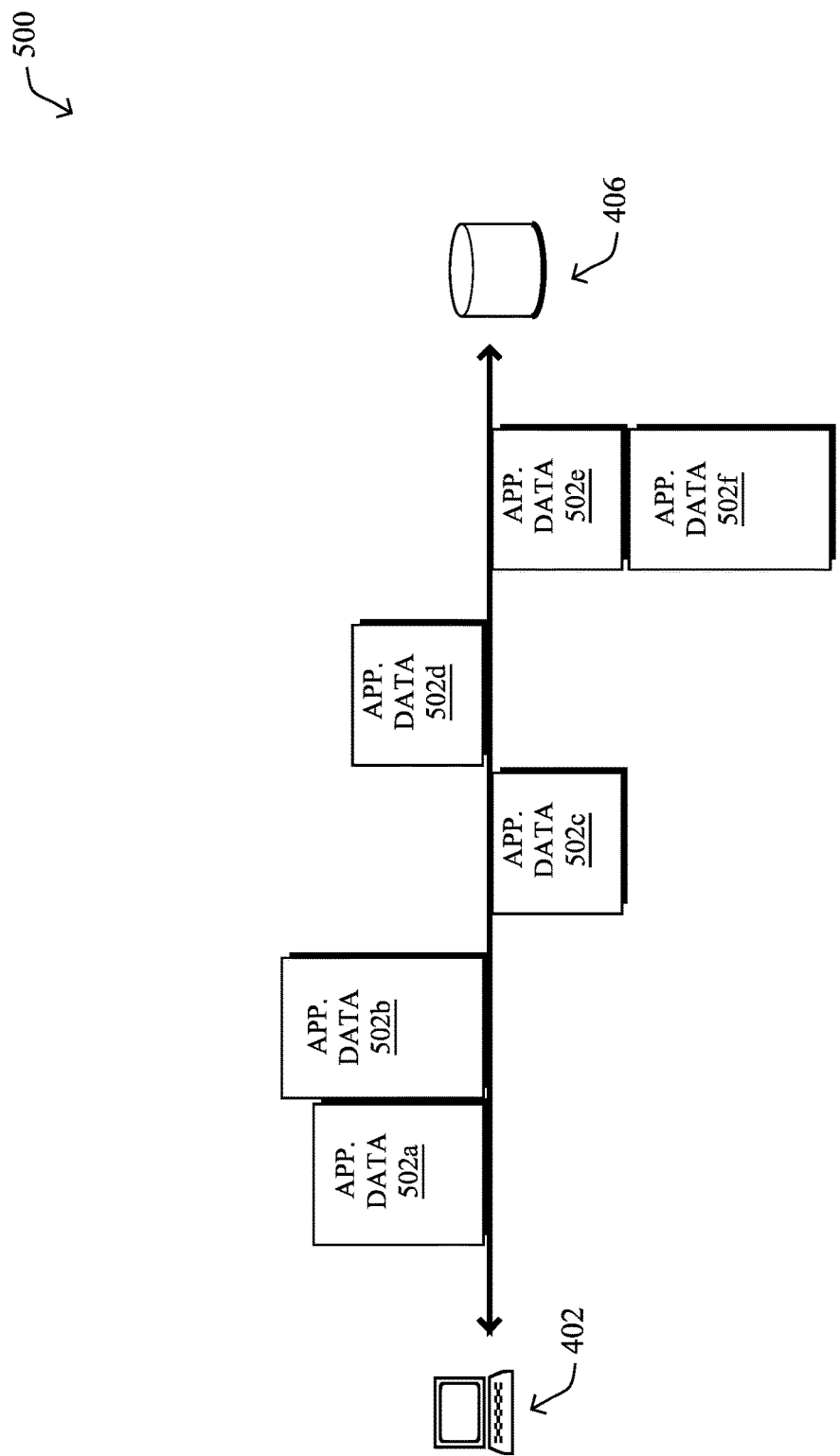
FIGS. 5A-5B illustrate an example of the examination of Transport Layer Security (TLS) traffic.
Figure 5B:
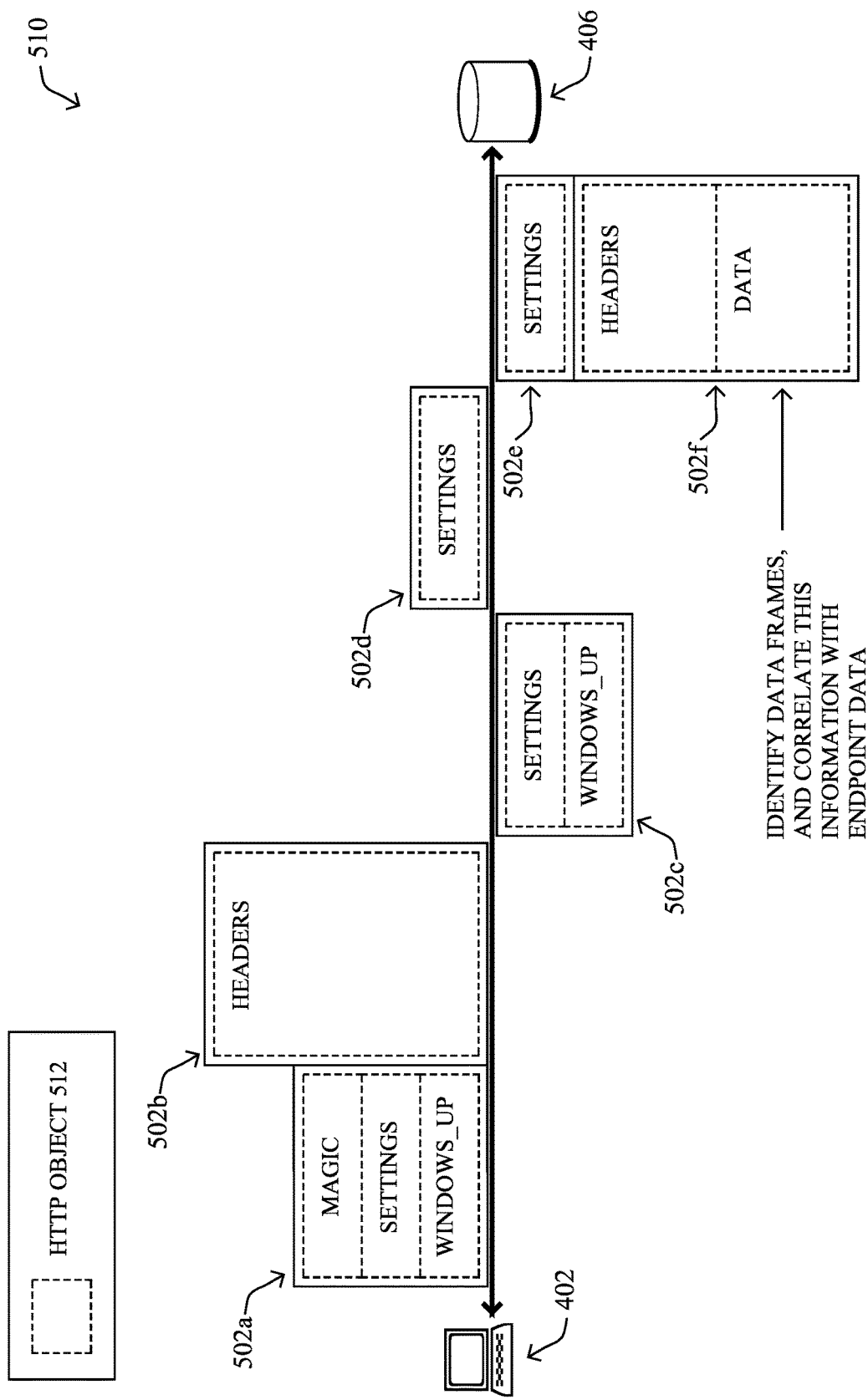

FIGS. 5A-5B illustrate examples of Transport Layer Security (TLS) traffic, in various embodiments. FIG. 5A illustrates an example 500 of TLS application records 502a-502f that may be observed in a TLS session between endpoint devices 402 and 406. Through classification of the observable features/characteristics of these records, using the above classification techniques, traffic analysis service 408 is able to infer/label these records with the types of HTTP objects that they contain. For example, in example 510 shown in FIG. 5B, each of the TLS application records 502a-502f from FIG. 5A may be classified and labeled according to the HTTP objects 512 that they contain. Said differently, inferences can be made by traffic analysis service 408 about the content of the encrypted traffic, without having to actually decrypt the traffic, based on its observable characteristics.

Once traffic analysis service 408 has labeled the TLS records with the types of HTTP objects that they contain, for each TLS ciphertext record, traffic analysis service 408 may predict the length of the corresponding TLS plaintext records. For example, this prediction may be based on knowledge of the cryptographic parameters of the TLS records (e.g., nonce, message authentication code, etc.) and HTTP artifacts (e.g., HTTP/2 DATA record headers, etc.). The sizes can then be merged following the rules of the HTTP pipelining, thereby inferring the file size of the file being conveyed, which can be correlated with the file information from the endpoint, to identify the particular file within the encrypted traffic.

Figure 6A:
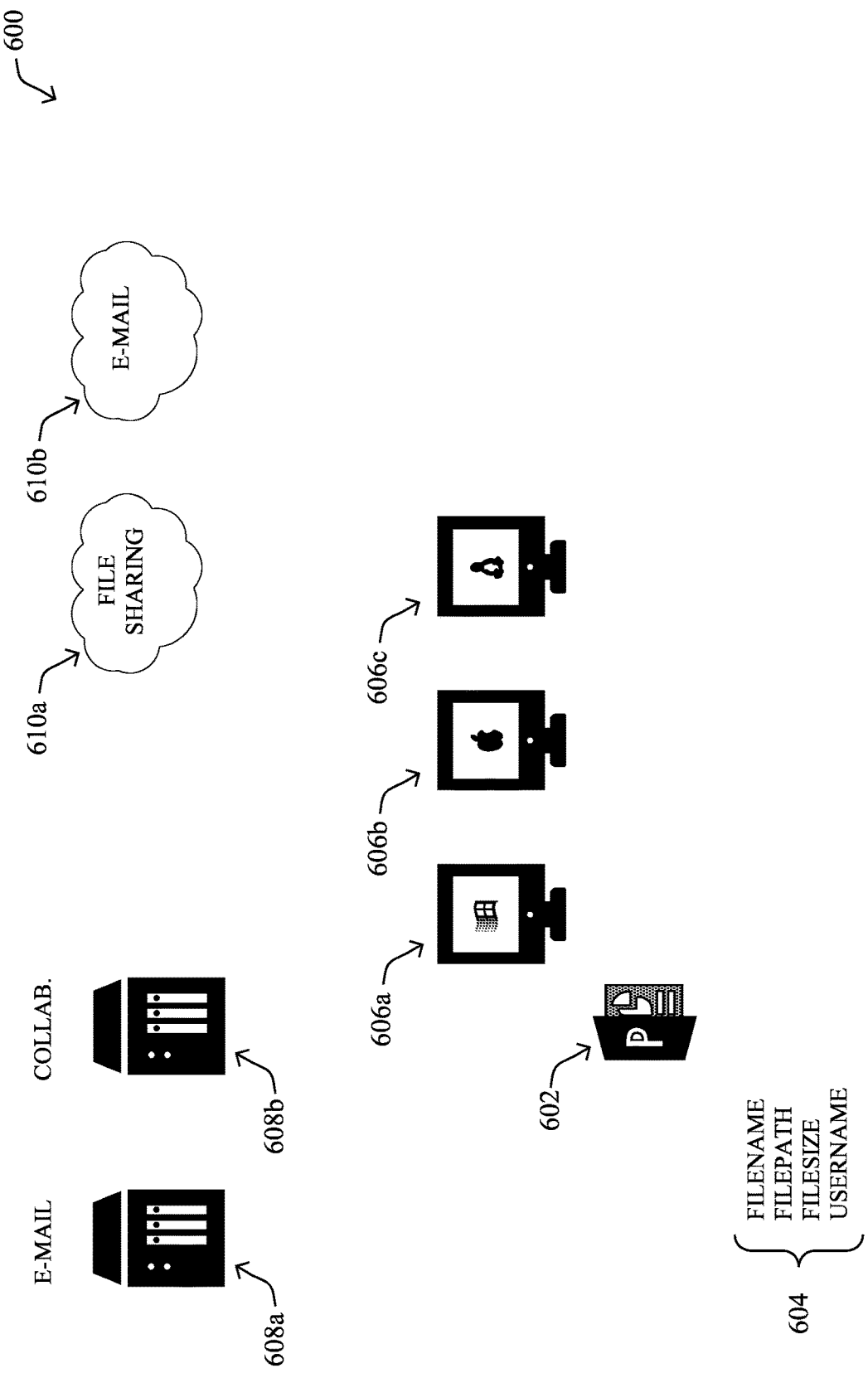
FIGS. 6A-6E illustrate an example of detecting and preventing data exfiltration in an enterprise environment.

FIGS. 6A-6E illustrate an example of detecting and preventing data exfiltration in an enterprise environment 600. As shown in FIG. 6A, enterprise environment 600 may include any number of endpoint clients 606, such as endpoint clients 606a-606c. In addition, enterprise environment 600 may also include any number of endpoint servers 608, such as an e-mail server 608a, a collaboration server 608b, or the like. There may also be any number of external services 610 outside of the local network of the enterprise, such as an external file sharing service 610a, an external e-mail service 610b, etc.

For purposes of illustration of the techniques herein, assume that a particular file 602 is created on endpoint client 606a. File 602 may have any number of file characteristics 604, such as a filename, filepath, filesize, creator username, etc. In various embodiments, an agent executing on endpoint client 606a can capture this file characteristic data and report it to a monitoring service in the network.

Figure 6B:
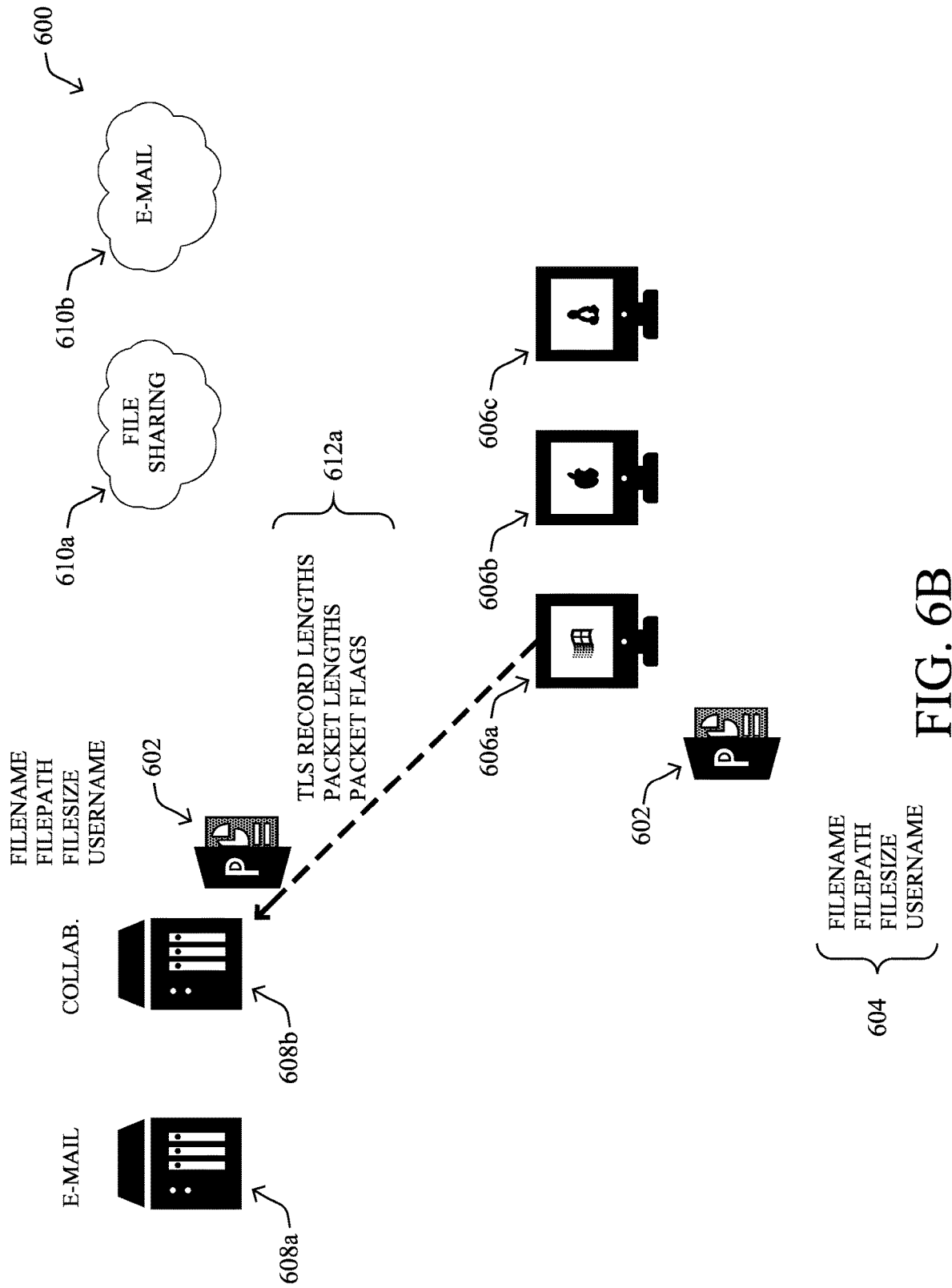

In FIG. 6B, now assume that endpoint client 606a sends a copy of file 602 to collaboration service 608b via encrypted traffic. Using the techniques herein, traffic data 612a regarding this encrypted traffic can be captured and reported to the monitoring service. For example, the traffic data may indicate the TLS record lengths, packet lengths, packet flags, etc. of the encrypted traffic. In some embodiments, the service may use traffic data 612a to infer characteristics of the content of the encrypted traffic and, by comparing the inferred characteristics to file characteristics 604, detect the file within the encrypted traffic. However, assume that this upload to collaboration server 608b internal to the enterprise network is allowed by policy.

Figure 6C:
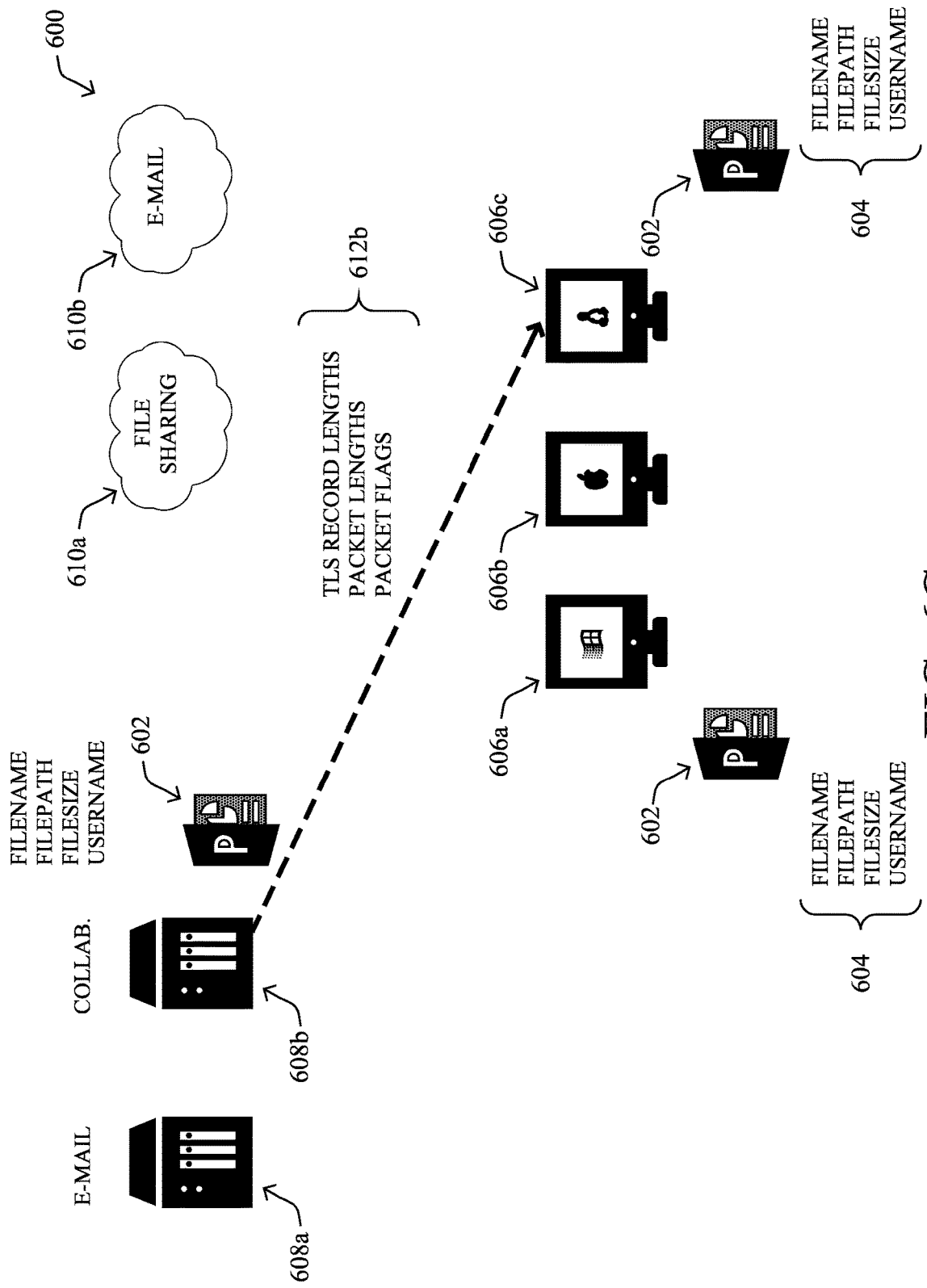

In FIG. 6C, assume now that endpoint client 606c then downloads a copy of file 602 from collaboration server 608b. Again, the service may capture the traffic data 612b regarding the resulting encrypted traffic and determine that the download is authorized by policy.

Figure 6D:
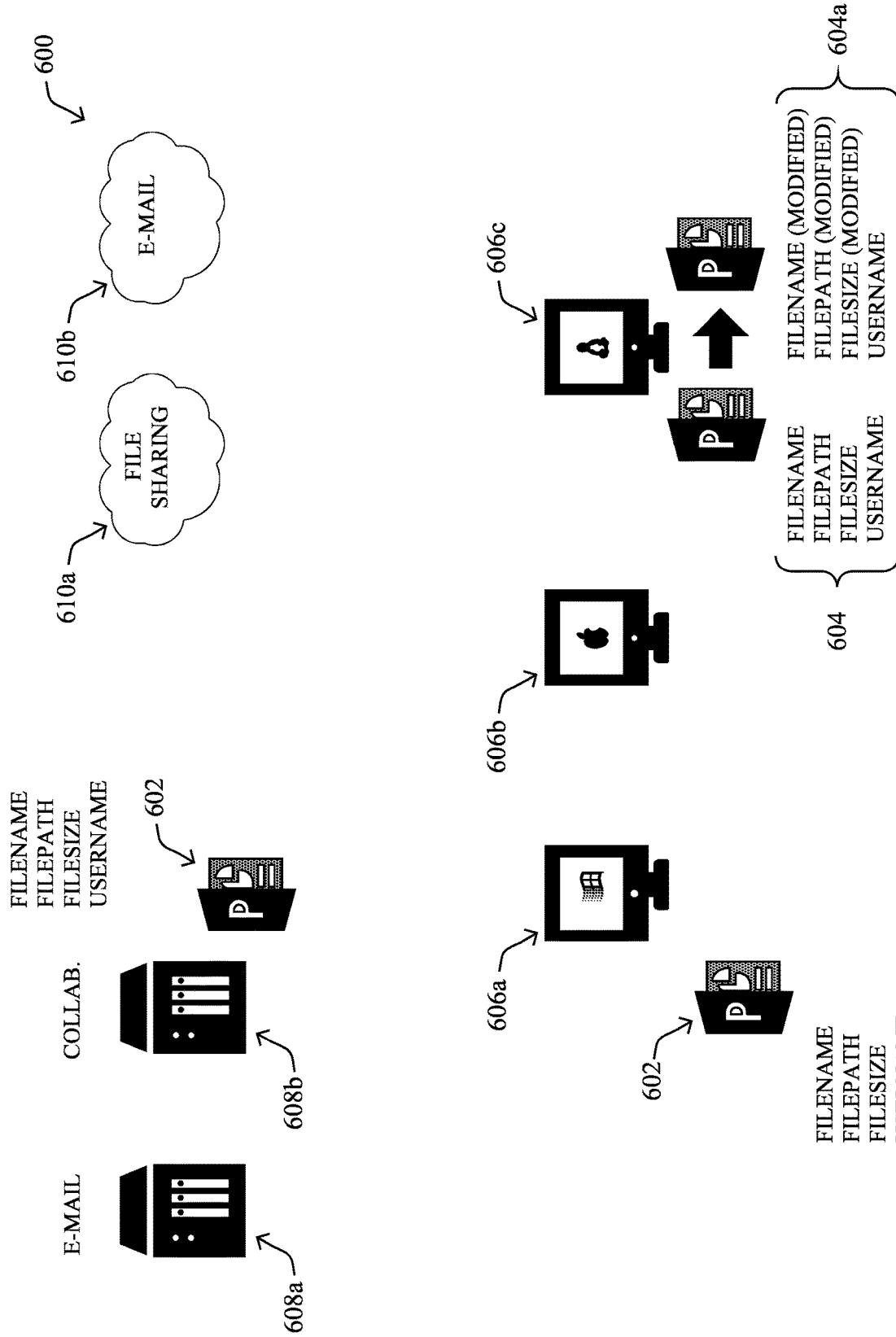

In FIG. 6D, now assume that the user of endpoint client 606c modifies file 602, thereby changing the file characteristics 604 into file characteristics 604a. These change may be captured by the agent executed by endpoint client 606c and sent to the network monitoring service, thereby tracking changes to the file over time.

Figure 6E:
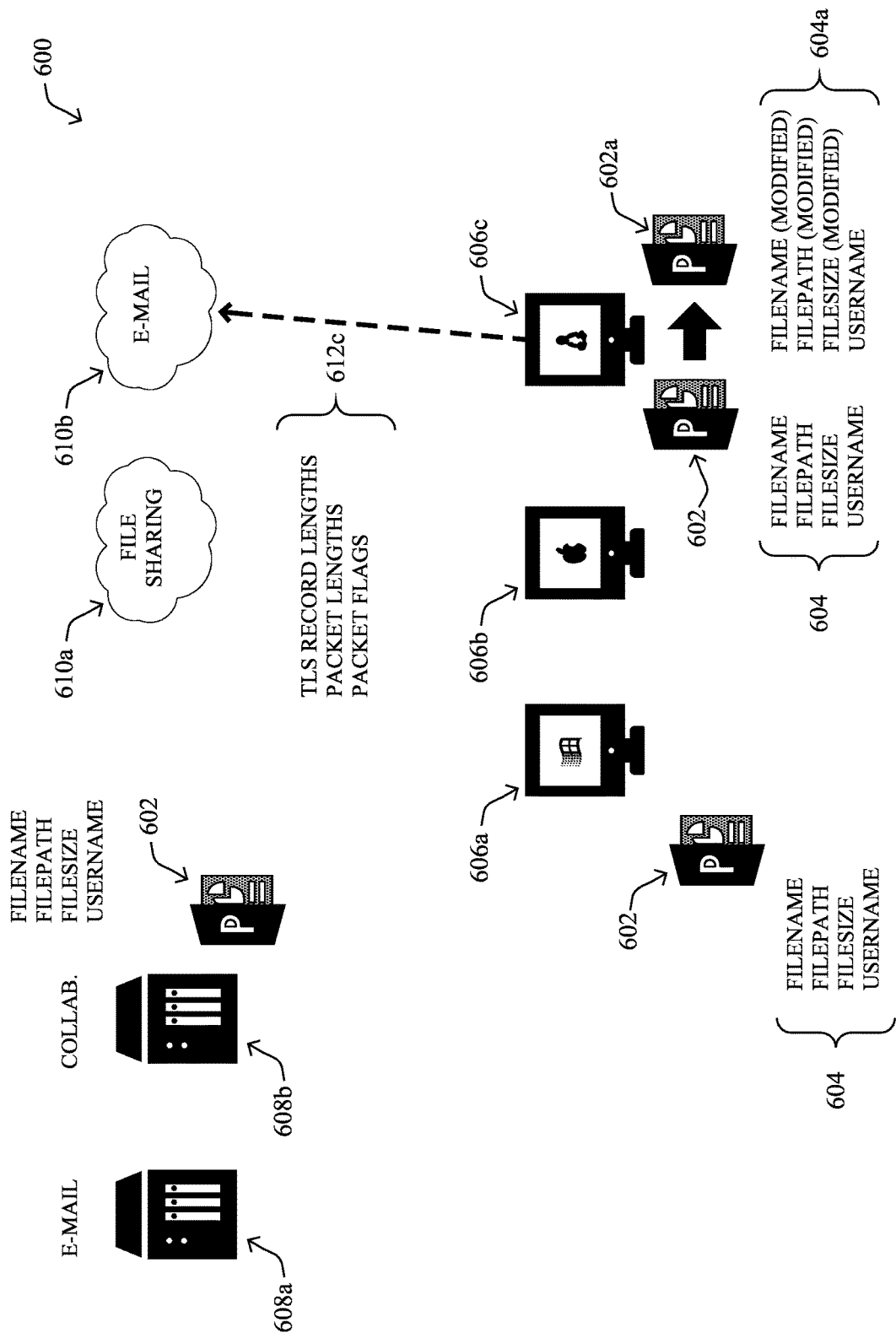

In FIG. 6E, now assume that endpoint client 606c attempts to upload the modified file 602 to external email service 610b, which is a policy violation. For example, assume that file 602 includes personally identifiable information that can be shared on the internal network of the enterprise, but is prohibited by policy from being sent externally. As part of this upload, the monitoring service may receive traffic data 612c regarding the encrypted traffic between endpoint client 606c and e-mail service 610b. Thus, by comparing the inferred characteristics of the encrypted content from traffic data 612c to the file characteristics 604a captured by the agent on endpoint client 606c, the service may determine that the encrypted traffic includes the file, which is a policy violation. In turn, the service may enforce the policy by initiating any number of corrective measures, such as blocking the upload, sending an alert to an administrator, etc.

To test the efficacy of the techniques herein, a number of live endpoints were profiled for information regarding the files on the endpoints. To ensure that only files that could contain sensitive information were analyzed, the identified files were filed exclusively for Microsoft Office and PDF file types. This produced a database of 259,306,478 file scan logs for a single day across 2,067,060 endpoints. The number of files on each endpoint during testing ranged from 1 to 8,300,124. Since the goal of the traffic analysis service is to detect a specific file coming from an end point based on its size, and since the machine learning algorithm used during testing had file size detection error rate of between 0 and 200 bytes (depending on the file size), testing was performed to better understand the file size distributions across the various endpoints, to predict the likely accuracy of detecting files by their sizes.

Figure 7A:
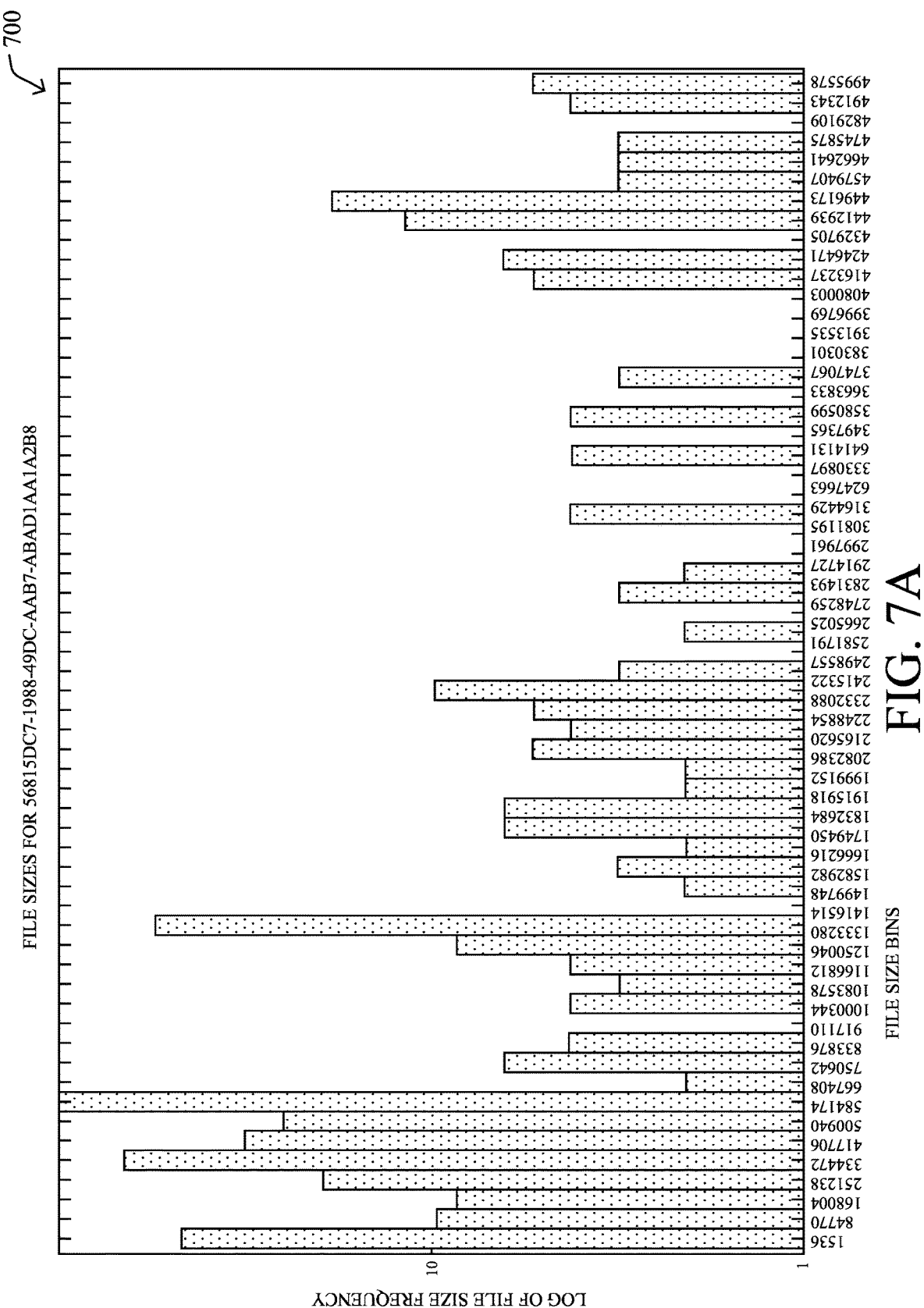
FIGS. 7A-7D illustrate example plots of file size distributions.

Across all endpoints, it was discovered that 98% of the endpoints held less than 500 files (or 2029650 of 2067060 endpoints). Therefore, endpoints from the 500 file or less group were selected, to analyze their file size distributions, the results of which are shown in plot 700 in FIG. 7A. From plot 700, it can be seen that the file size distribution is fairly even between less than 1536 bytes all the way up to 5 M. This indicates that there is a very high probability of detecting any given file that exits within this group of endpoints based on its file size. Even in the densest ranges of file sizes (between 600,000 and 700,000 bytes), there is a match of 75 files. However, the distance between each file size falls well within the error range of the file size algorithm (+/−100 bytes).

Figure 7B:
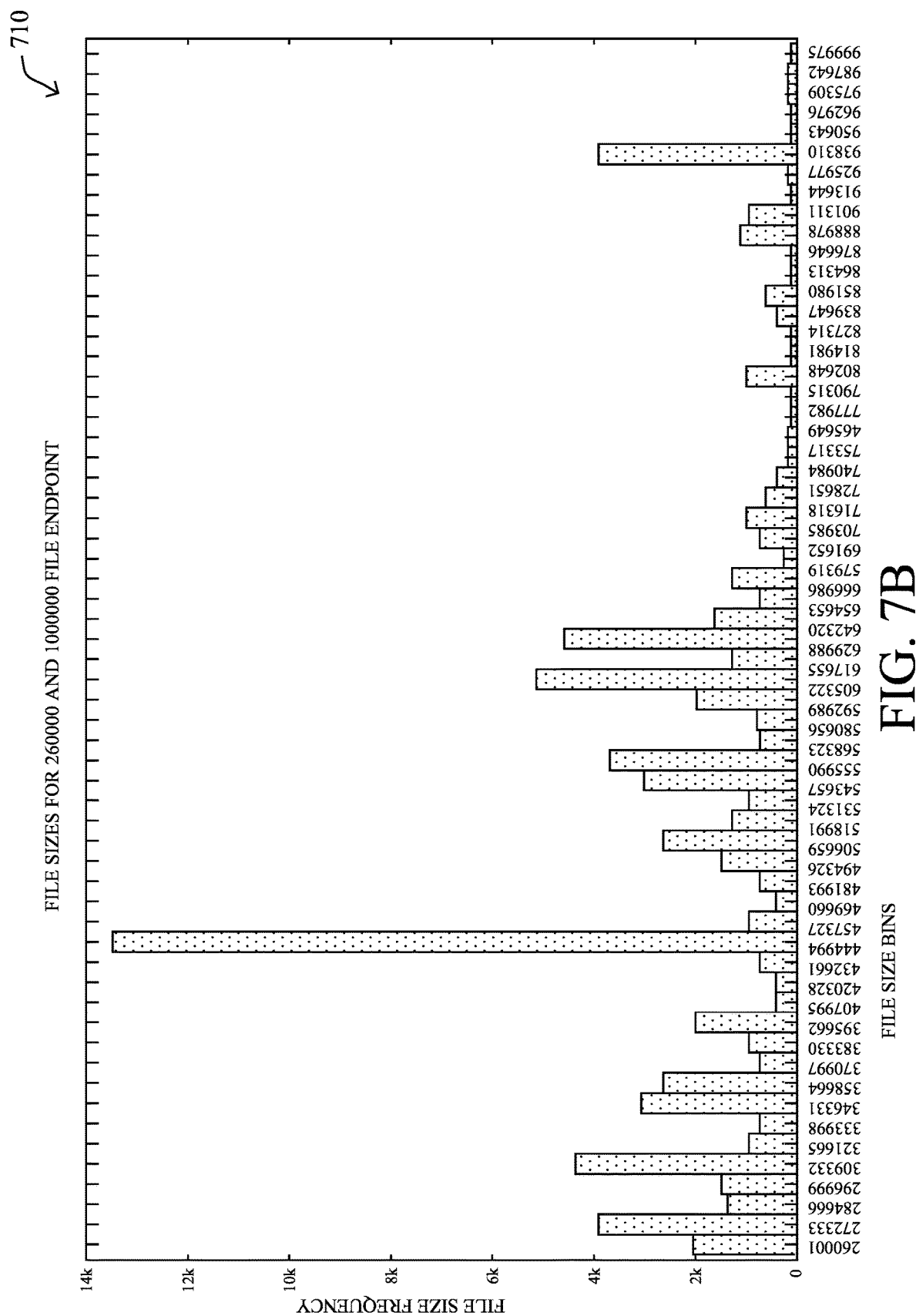

However, for the endpoints containing the largest number of files (8 M on the endpoint), there are some file sizes that may not have sufficient byte separation for the algorithm to distinguish individual files, as shown in plot 710 in FIG. 7B. Since the separation of the file size bins is approximately 12K, there is not enough of a window to accommodate 14 k files with sufficient distinction.

Figure 7C:
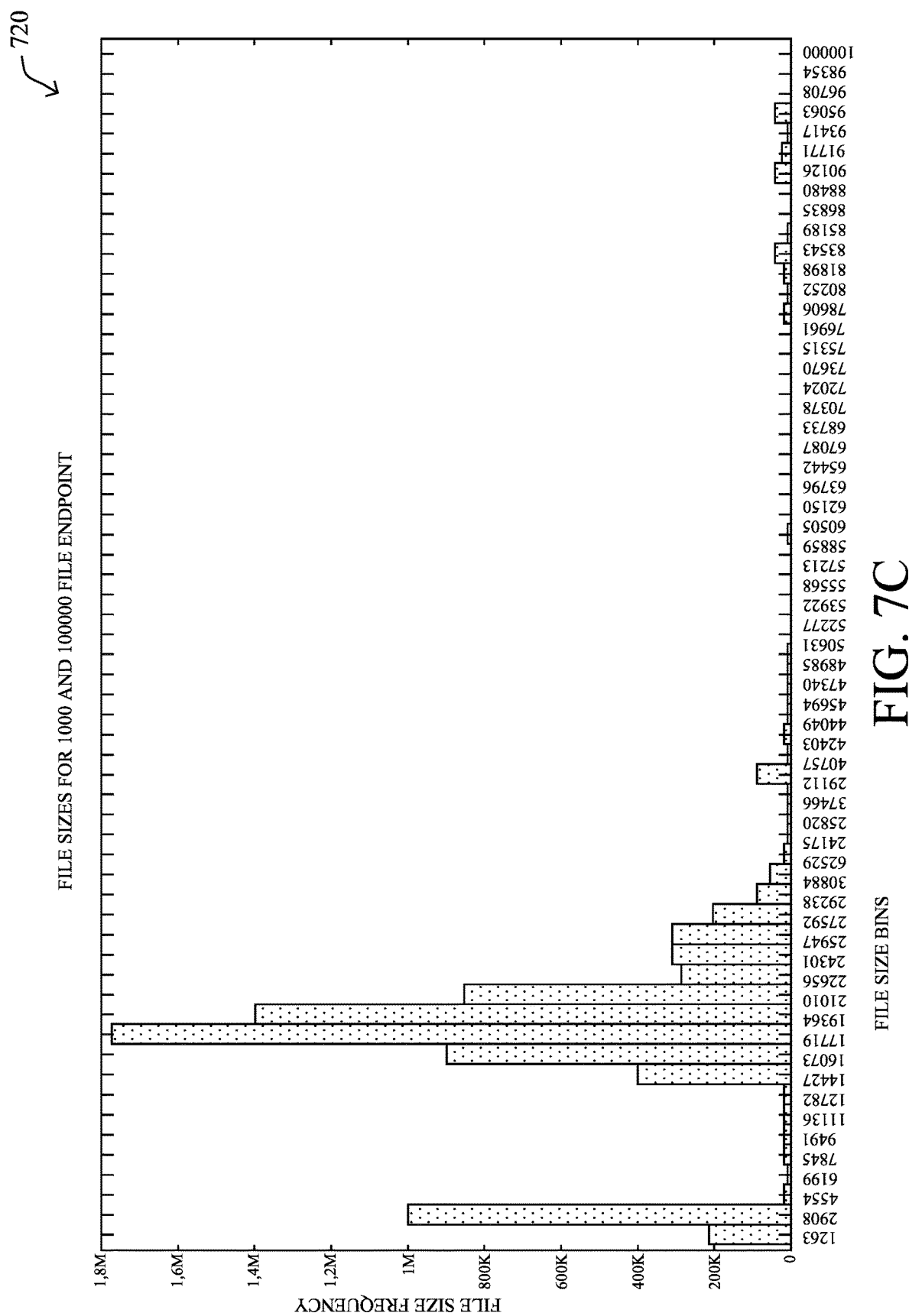
Figure 7D:
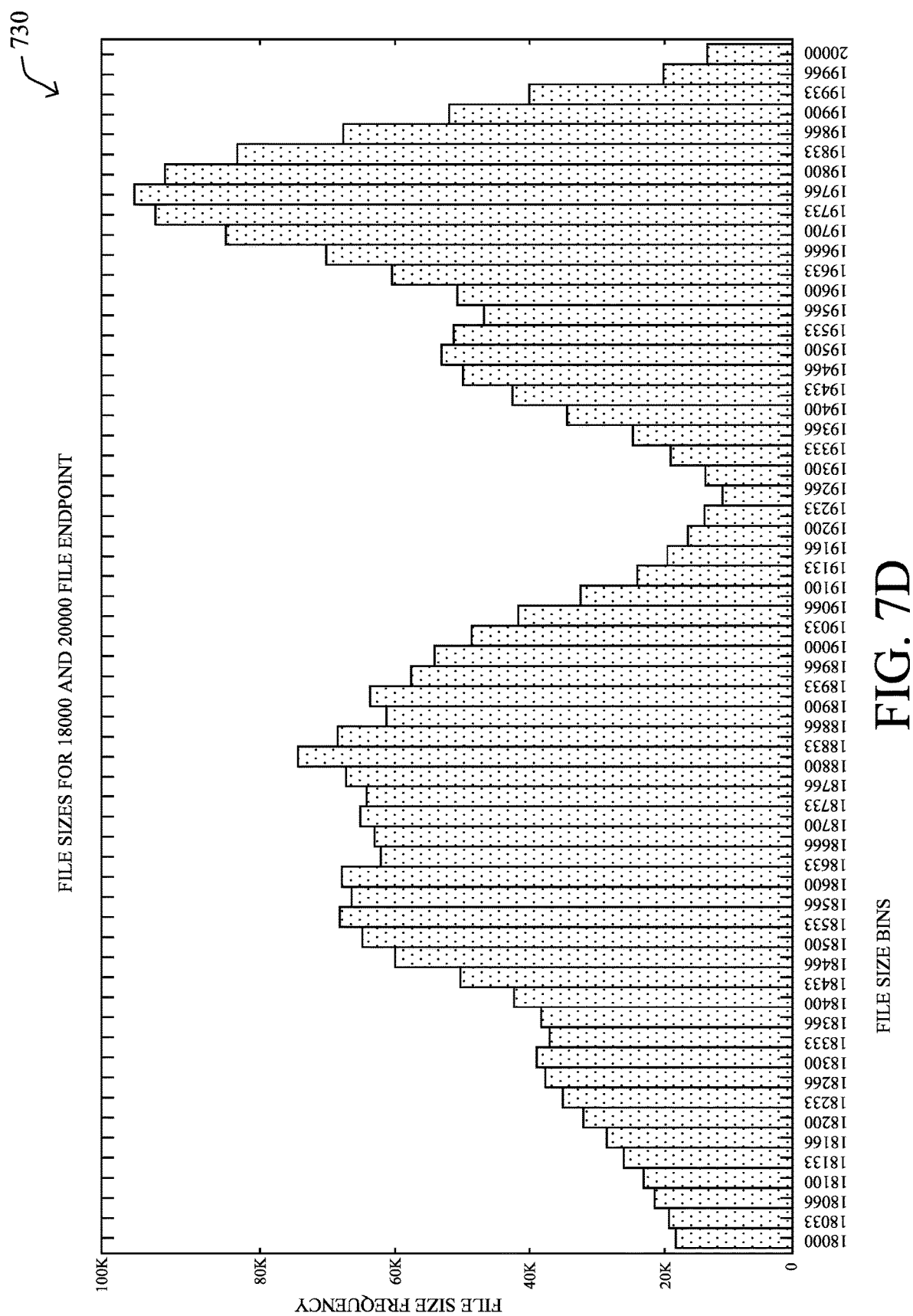

Additionally, when looking at the file size distribution for files between 1K and 100K, there are peaks of up to 1.8 M files of sizes between 18K and 20K. Files leaving this endpoint with those file sizes will not likely be differentiated using file size alone, as shown in plots 720 and 730 in FIGS. 7C and 7D, respectively.

As noted above, the techniques herein allow for the detection and tracking of the movement of files across a network, even via encrypted traffic. Once the service detects a specific file, it can apply a policy to the file based on its sensitivity and, if need be, cause the performance of a mitigation action. For example, the service may generally ignore the movement of an unclassified file across the network, but flag the movement of secret or top secret files as policy violations.

Due to the sheer number of files in a given network, it may be unfeasible to explicitly label the sensitivity of each file (e.g., a user manually flags a given file as "Confidential"). While it may be possible to automate the flagging based on the contents of the files, this approach is both computationally intensive and scales poorly with respect to new data formats. Additionally, most enterprises have at least a subset of unmonitored endpoints that are not capable of running the needed data loss prevention (DLP) agents, e.g., unsupported operating systems, printers, cameras, and HVAC systems.

Unstructured Data Sensitivity Inference for File Movement Tracking in a Network

The techniques herein introduce a non-intrusive system that can infer the sensitivity of unstructured data without requiring an enterprise to install DLP agents on every device capable of storing data, which is unrealistic in many network deployments. an unrealistic requirement. In some aspects, the system can base the inferred sensitivity score of a file on metadata such as, but not limited, to any or all of the following:
- file sizes
- file type (pptx, .c, .h) or the 'magic bytes' at the start of a file such as GIF87a
- media content type and subtypes as managed by IANA as part of the MIME standard
- file names and/or paths
- file hashes
- network-specific prevalence information, e.g., number of times the file appears on different endpoints
- the roles of the endpoint's owners In further aspects, a machine learning-based classifier can be trained using a labeled dataset of metadata for a set of file and used to infer a sensitivity score for a specific file under scrutiny. Such inferences can be used as a stand-alone service or, alternatively, to supplement an existing DLP system in the network, e.g., by delivering visibility for unmonitored endpoints.

Specifically, according to one or more embodiments of the disclosure as described in detail below, a traffic analysis service that monitors a network obtains file metadata regarding an electronic file. The traffic analysis service determines a sensitivity score for the electronic file based on the file metadata. The traffic analysis service detects the electronic file within traffic in the network. The traffic analysis service causes performance of a mitigation action regarding the detection of the electronic file within the traffic, based on the sensitivity score of the electronic file.

Illustratively, the techniques described herein may be performed by hardware, software, and/or firmware, such as in accordance with the traffic analysis process 248, which may include computer executable instructions executed by the processor 220 (or independent processor of interfaces 210) to perform functions relating to the techniques described herein.

Operationally, the file sensitivity classification techniques introduced herein are designed to be highly flexible and not dependent on DLP agent software running on all endpoints or formal data management application programming interfaces (APIs) with cloud service providers. The techniques also do not require decryption or decoding of file contents but uses file metadata and data generated by other supporting systems (e.g., backup, malware scanning or even other DLP agent systems) to infer sensitivity of unstructured data on enterprise endpoints. In particular, traffic analysis process 248 may infer the sensitivity of a given file based on metadata associated with the file such as, but not limited to, the following:
- file path and name
  - this information can be used to whitelist certain files, such as system files (e.g., operating system, application, common libraries, etc.)
  - The traffic service can also normalize file names and paths (e.g., by removing stop-words, punctuation, capitalization, etc.) and finding stems (e.g., 'confidential' also matches 'confidentially')
- file type (e.g., 'magic bytes', file suffix, or media content types and subtypes as managed by IANA and MIME standard)
- the frequency the file appears across the network using file hashes generated by malware scanners (e.g., AMP4E) or backup utilities
- the grade-level, work location and/or department of the users who have access to the file based on user id, access rights, or directory information (e.g., LDAP, HR systems, etc.)
- whether a malware scanner has found malware on the endpoint This metadata may be obtained by the traffic analysis service from the monitoring agent on the client(s) hosting the file and/or from other services present in the network, such as a user policy service. In turn, the service may use this file metadata to infer the file sensitivity using either predefined weights that are assigned to each file metadata observation or automatically by assigning the weights as coefficients of a linear classifier trained on example data sets of files with known sensitivity, in various embodiments.

For purposes of inferring the file sensitivity of a detected file, the size of the file alone is not likely to provide enough actionable information. Accordingly, in various embodiments, the traffic analysis service may further infer the file sensitivity based on other metadata regarding the file, such as its file name, file path, frequency of occurrence on endpoints in the network, etc.

In various embodiments, to assess the file names or file paths associated with the files, the traffic analysis service may first determine the word use frequencies of the file name or file paths across the different endpoints in the network. To do so, the service may employ a list of 'non-words,' e.g., words that are to be ignored in the frequency analysis, such as "for," "in," "is," etc., and proper nouns such as "Outlook," "Windows," "Applications," etc. For example, the following list in Table 1 presents a representative set of non-words that can be used with the techniques herein:

TABLE 1

| | | | | | |
|---|---|---|---|---|---|
| DOCX | NAMESPACE | FILE | BACKUP | AND | ACROBAT |
| XLS | DOWNLOADS | FILE: | SETTINGS | WITH | APPLICATIONS |
| XLSX | RECYCLE.BIN | USERS | TEMPORARY | ON | DOCUMENTS |
| DOC | APPDATA | SYSTEM | OLD | BY | MICROSOFT |
| PPT | TEMP | FOLDERS | LOCALUSER | IF | ONEDRIVE |
| PPTX | DATA | FROM | INTERNET | IS | WINDOWS |
| CSC | LOCAL | USER | FOR | OF | DROPBOX |
| V2.0.6 | HOME | ROAMING | TO | NEW | DESKTOP |
| • | PUBLIC | SERVER | FOLDER | NOT | CONTENT.OUTLOOK |
| DRIVE | OFFICE | SHARES | PROGRAM | IN | |
| SHARE | FILES | SERVERS | DOCS | THE | |

As would be appreciated, other sets of non-words can be used, as desired. Some of the words shown in Table 1 were selected as non-words because they are on all systems due to application behavior. For instance, "CSC," "v2.0.6," and "NAMESPACE" are used by Windows to cache on-line content to the local machine. Also, words like "FOLDER" and "DOCUMENTS" are standard file path descriptors for application data stores. Note that while the non-words may be ignored for purposes of assessing word frequency in file names or file paths on the clients, they may still be used for purposes of calculating file sensitivity scores, in some embodiments. In the context of word frequencies, however, they provide little value and can be ignored when analyzing the word frequencies.

A survey of a plurality of endpoints was performed by parsing all file paths and URL encoded space separators, such as ':' and '/' and '%20'. In turn, each word was separated out and its frequency counted. The top 100 most frequent words, excluding the non-words in Table 1, are shown below in Table 2:

TABLE 2

| Word | Count |
|---|---|
| 2017 | 9162044 |
| SHARED | 9035981 |
| 2015 | 8525999 |
| 2016 | 8506031 |
| 2014 | 7502072 |
| 2013 | 6818570 |
| REPORTS | 6600376 |
| ARCHIVE | 5798999 |
| 2012 | 5381573 |
| PDF | 4967935 |
| REPORT | 4888590 |
| STAFF | 4559165 |
| 2011 | 4390203 |
| 2018 | 4001300 |
| GTHRSVC_OSEARCH14 | 3964879 |
| FORMS | 3414598 |
| 0 | 3404726 |
| 2010 | 3398715 |
| TEACHERS | 3368794 |
| GTHRSVC | 3163943 |
| 12 | 3008266 |
| MANAGEMENT | 2971093 |
| DE | 2943468 |
| SERVICE | 2793910 |
| CLIENTS | 2723938 |
| STAMPS | 2721199 |
| PROJECTS | 2684955 |
| MANUALS | 2659308 |
| WORK | 2636102 |
| LETTER | 2633132 |
| COPY | 2531223 |
| 2009 | 2409056 |
| RESOURCES | 2366324 |
| CLIENT | 2365028 |
| PAYROLL | 2364871 |

TABLE 2-continued

| Word | Count |
|---|---|
| INVOICES | 2333234 |
| FINANCE | 2328684 |
| COMPANY | 2288127 |
| SCAN | 2242204 |
| ACCOUNTING | 2238937 |
| TCSLA | 2222441 |
| PRODUCTION | 2202035 |
| RECORDS | 2191930 |
| DAILY | 2148497 |
| 2008 | 2143970 |
| 10 | 2143362 |
| PAGE | 2139575 |
| 1 | 2117665 |
| SALES | 2085310 |
| FINAL | 2018045 |
| SCHEMATICS | 2015677 |
| FORM | 2009443 |
| REN-FS01 | 2006243 |
| PROJECT | 1981249 |
| SMA | 1964604 |
| DATABASE | 1924552 |
| INFORMATION | 1922903 |
| ENGINEERING | 1851921 |
| BUSINESS | 1840857 |
| TEST | 1823190 |
| COMMON | 1785446 |
| PORTFOLIOS | 1780797 |
| HR | 1759820 |
| MULTP | 1718636 |
| MAY | 1710594 |
| DOWNTIME | 1697485 |
| SERVERFOLDERS | 1684544 |
| PORTFOLIO | 1676127 |
| DRAWINGS | 1651964 |
| DEPARTMENTS | 1647301 |
| SNAGIT | 1639020 |
| INFO | 1627396 |
| APRIL | 1626417 |
| REQUEST | 1609762 |
| TECHSMITH | 1606130 |
| GRADE | 1602877 |
| LIST | 1601881 |
| LOADER | 1597569 |
| PLAN | 1594596 |
| SCHOOL | 1587320 |
| MANAGEMENTPLUS | 1584441 |
| ADMIN | 1579732 |
| 11 | 1558776 |
| DOCUMENTOS | 1539558 |
| ACCOUNTS | 1538144 |
| AUDIT | 1535967 |
| PLANS | 1528241 |
| 2007 | 1525132 |
| MONTHLY | 1512380 |
| STUFF | 1506498 |
| SHEET | 1505317 |
| 15 | 1495411 |
| STUDENT | 1488162 |
| BACKUPS | 1486742 |
| DEPARTMENT | 1462456 |
| JUNE | 1456311 |

TABLE 2-continued

| Word | Count |
|---|---|
| PRIVATE | 1421247 |
| YEAR | 1412043 |
| EDOCUMENTS | 1409497 |
| GROUP | 1405520 |

From the results shown in Table 2 above, it can be seen that common words like dates and numbers appear quite frequently in the file paths and file names. Additionally, there are some interesting words that might indicate more sensitive information such as 'HR,' 'PAYROLL,' 'CLIENT,' 'FINANCE,' and 'INVOICES.'

In various embodiments, the word frequencies from the file paths and file names can be used by the traffic analysis service to apply weightings to the identified words, based on their implied sensitivity. In particular, the word frequencies, potentially in combination with prior assumptions about certain sensitive words, can be used to create a mapping of words to weightings, which can be easily adjusted based on group and industry factors. For example, Table 3 below illustrates an example dataset of word weightings:

TABLE 3

| Word | Weight |
|---|---|
| INVOICE | 4 |
| BUDGET | 4 |
| CUSTOMER | 6 |
| DESIGN | 7 |
| CONTRACT | 8 |
| SPECIFICATION | 8 |
| SPECS | 8 |
| PRIVATE | 9 |
| PERSONAL | 9 |
| CONFIDENTIAL | 10 |
| SENSITIVE | 10 |
| PROJECT | 5 |
| GOVERNMENT | 6 |
| PERSONNEL | 6 |
| VENDOR | 6 |
| PARTNER | 6 |
| HEALTH | 6 |
| LEGAL | 7 |
| LAW | 7 |
| ASSESS | 5 |

Of course, the full set of mappings between words and weights may include hundreds, or even thousands, of mappings between words and weights. The traffic analysis service can then use the full set of mappings of files, file sizes, hashes, and/or weights, to compare them with all files across a specific business group, across multiple groups (depending on chosen scope of the analyzer), or across the network, to determine if those files appear elsewhere. The premise is that if the file appears elsewhere, it may be more useful/valuable to the business group than single files only appearing on one endpoint. From this, the traffic analysis service now has a list of files, their word weights from their file names and/or file paths, and how often those files are seen across the enterprise, to develop an inferred sensitivity weighting.

In some embodiments, further metadata that the traffic analysis service may take into account when calculating the file sensitivity of a given electronic file may include whether malware was detected on a hosting endpoint of the file. Thus, even if a file is fairly common on the various endpoints in the network, and is otherwise innocuous from a word standpoint, the traffic analysis service may nonetheless increase the sensitivity of the particular file, if its hosting endpoint has been flagged as a malware host. As would be appreciated, doing so may help to track and potentially prevent the spread of malware, which may attempt to spread itself in the network via distribution of an infected file.

Using the inference about the importance of words used in the file path and/or file name, the traffic analysis can then analyze the files across business groups or for an individual endpoint. For example, for each word that is matched within the file's path and filename, the service may sum the associated word weights. Below is a sample of the weights based on the keywords shown above and sorted by frequency across multiple endpoints. Note that the actual file name and path were removed for privacy reasons and genericized as "FILEXX." In this case, one of endpoint was also flagged as infected with malware, so all scores were incremented by 5:

TABLE 4

| Path | Weight | Freq. |
|---|---|---|
| FILE:/EXCEL98.XLS | 5 | 17 |
| FILE:///FILE01 . . . | 5 | 1 |
| FILE:///FILE02 . . . | 5 | 1 |
| FILE:///FILE03 . . . | 5 | 1 |
| FILE:///FILE04 . . . | 13 | 0 |
| FILE:///FILE05 . . . | 13 | 0 |
| FILE:///FILE06 . . . | 13 | 0 |
| FILE:///FILE07 . . . | 13 | 0 |
| FILE:///FILE08 . . . | 13 | 0 |
| FILE:///FILE09 . . . | 13 | 0 |
| FILE:///FILE10 . . . | 13 | 0 |
| FILE:///FILE11 . . . | 13 | 0 |
| FILE:///FILE12 . . . | 13 | 0 |
| FILE:///FILE13 . . . | 13 | 0 |
| FILE:///FILE14 . . . | 13 | 0 |
| FILE:///FILE15 . . . | 13 | 0 |
| FILE:///FILE16 . . . | 13 | 0 |
| FILE:///FILE17 . . . | 13 | 0 |

From the above information in Table 4, it can be seen that four of the files were detected on multiple endpoints. Using this approach, testing revealed that a single endpoint had 1,030,560 files, which were then sorted by word weight and frequency of occurrence across multiple endpoints in the network. Of these files, only one file was found to occur 87 times across all endpoints, whereas three of the files appeared only on other endpoints within the same business group associated with the reference endpoint. For the highest inferred sensitivity files, there were none that appeared on multiple systems and only three of low inferred sensitivity appearing on one other endpoint. The highest inferred sensitivity score is 14 as a sum of the highest rating of 9, with an automatic addition of 5 because malware was detected on this endpoint. Words that could mark a file path to be 9, based on their word weight, included 'PRIVATE' and 'CONFIDENTIAL,' which could raise to the level of concern for a corporation. Of course, the reference endpoint in testing represents a worst-case scenario, having over one million files, with 1,171 of file size 10,752 or greater that are inferred to be sensitive. With endpoints containing fewer files, there is a much higher likelihood of matching the exact file based on size. For example, consider the case of a medium complexity endpoint containing 233,863 document files. The most frequent file size on that endpoint was a maximum of 529 files of the 20992 bytes (0.98 probability of accuracy). Using the sensitivity measurement, 22 files were identified as having sensitivity values greater than 1 and only 11 possible files with sensitivity measurements above 5. Therefore, there is an even higher probability (0.99999) of determining that a sensitive file is leaving an endpoint out of policy, if the endpoint has a more typical number of files.

As noted previously, yet another factor that the traffic analysis service may take into account when calculating the file sensitivity of a file is the user profile information associated with the instances of the file in the network. For example, the traffic analysis service may assess the specific user(s) that authored or edited a file, their positions in the organization (e.g., CEO, engineer, etc.), and/or their business unit (e.g., HR, R&D, etc.), to adjust the sensitivity score of a given file, accordingly. The type of file, in combination with the user profile information, can also affect the sensitivity score, in some embodiments. For example, a compressed file (e.g., .ZIP, etc.) that exists on multiple endpoints operated by programmers in a certain department may have a higher sensitivity score than a compressed file shared among employees in another department. Similarly, a file that appears only on the CEO's computer and the CFO's computer may receive a high sensitivity score, based on its associated users.

As would be appreciated, the adjustment to any sensitivity score may be a function of how the sensitivity scores are ranged. For example, the user profile, malware detection metadata, etc. may be accounted for via a score multiplier or added to a base score. In addition, which metadata considered by the service, as well as its impact on the sensitivity scores, may also be controlled via one or more user-specified parameters, to allow a network administrator to control the scoring.

According to various embodiments, the traffic analysis service may also employ a machine learning-based classifier, to label a particular electronic file with a sensitivity score, based on its metadata. For example, such a classifier may be trained by assigning/labeling a set of files with sensitivities. In turn, these files, their associated metadata, and labeled sensitivities can be used train a machine learning-based classifier that can be used to assess new files and their metadata. For example, if files located on the CEO's computer are consistently flagged as "sensitive," the model may learn over time to increase the sensitivity score, whenever a given file is located on the CEO's computer. Note that such training can be performed on a network-by-network basis, in some cases, allowing for customizations to be made per deployment.

Based on the inferred sensitivity score for a detected file in transit between endpoints, the traffic analysis service may cause the performance of any number of mitigation actions. In the most extreme cases, the service may block, delay, or even re-route the traffic, to prevent reception of the file by its intended recipient. However, in further embodiments, the mitigation action may simply take the form of an alert that the traffic analysis service sends to a user interface for review. For example, the alert may identify any or all of the following: the particular file, the source endpoint, the destination endpoint, user information associated with either or both endpoints, the metadata associated with the file, a breakdown of the encrypted session analysis, and/or the particular policy violation.

Figure 8:
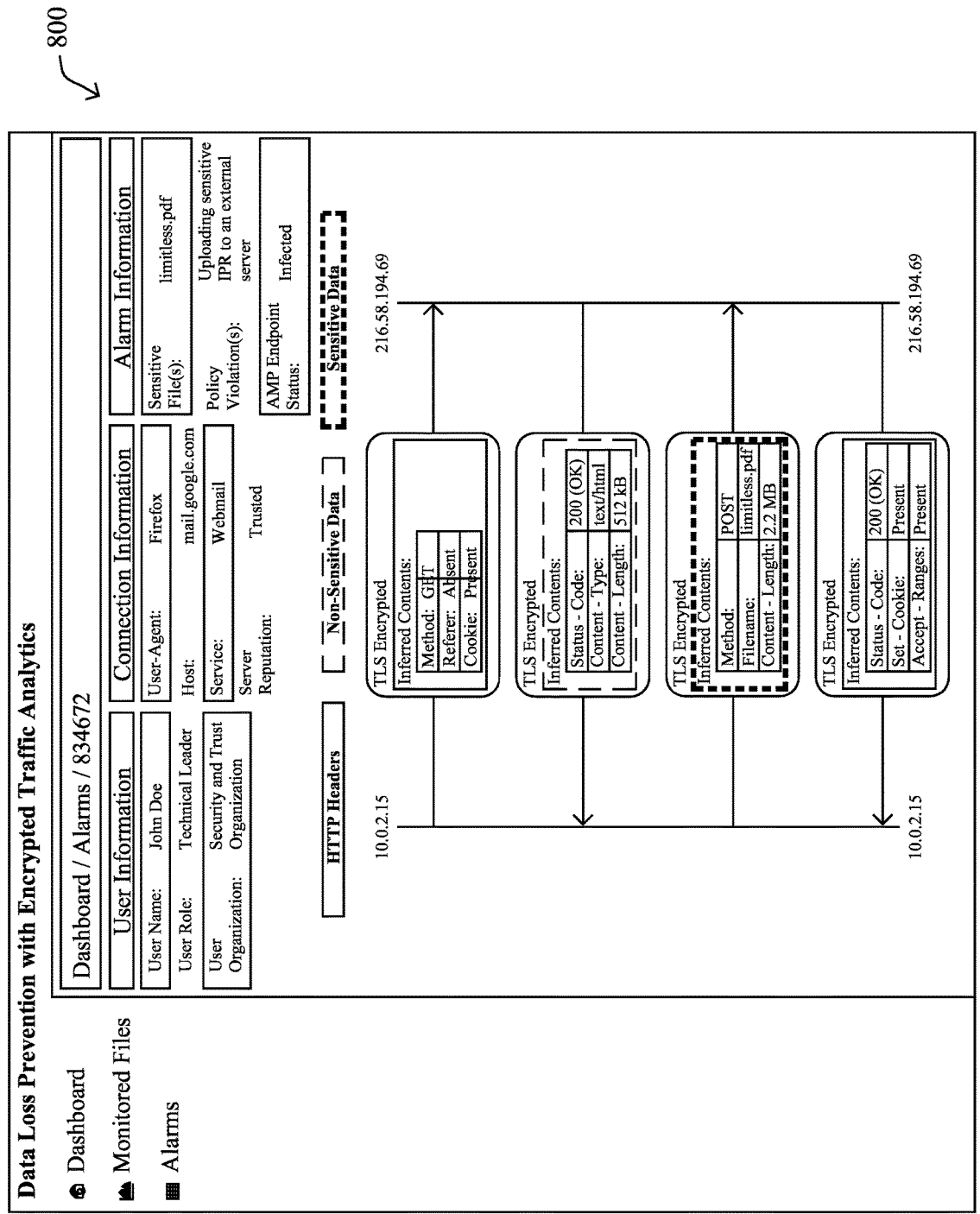
FIG. 8 illustrates an example user interface indicating detection of a sensitive file within encrypted traffic.

FIG. 8 illustrates an example user interface 800 indicating detection of a sensitive file within encrypted traffic, in some embodiments. As shown, user interface 800 indicates that the endpoint associated with user "John Doe" has sent a sensitive file, "limitless.pdf" to an external webmail service, which is a policy violation. Notably, the traffic analysis service may identify the "limitless.pdf" file within the encrypted traffic between the endpoints by matching the file size information from the endpoint agent on John Doe's device to that inferred from analysis of the TLS traffic. Once identified, the service may determine the sensitivity score for the file, such as by taking into account the user profile information for John Doe (e.g., that John Doe works in the Security and Trust Organization), the frequency of the file across the endpoints in the network (e.g., the PDF is only found on Security and Trust Organization endpoints), detected malware on John Doe's device, words found in the file path or file name of the file, and the like. In turn, the service may flag the transfer as a policy violation and generate the alert shown by user interface 800, since the file is being transferred external to the network and/or outside of the Security and Trust Organization.

Figure 9:
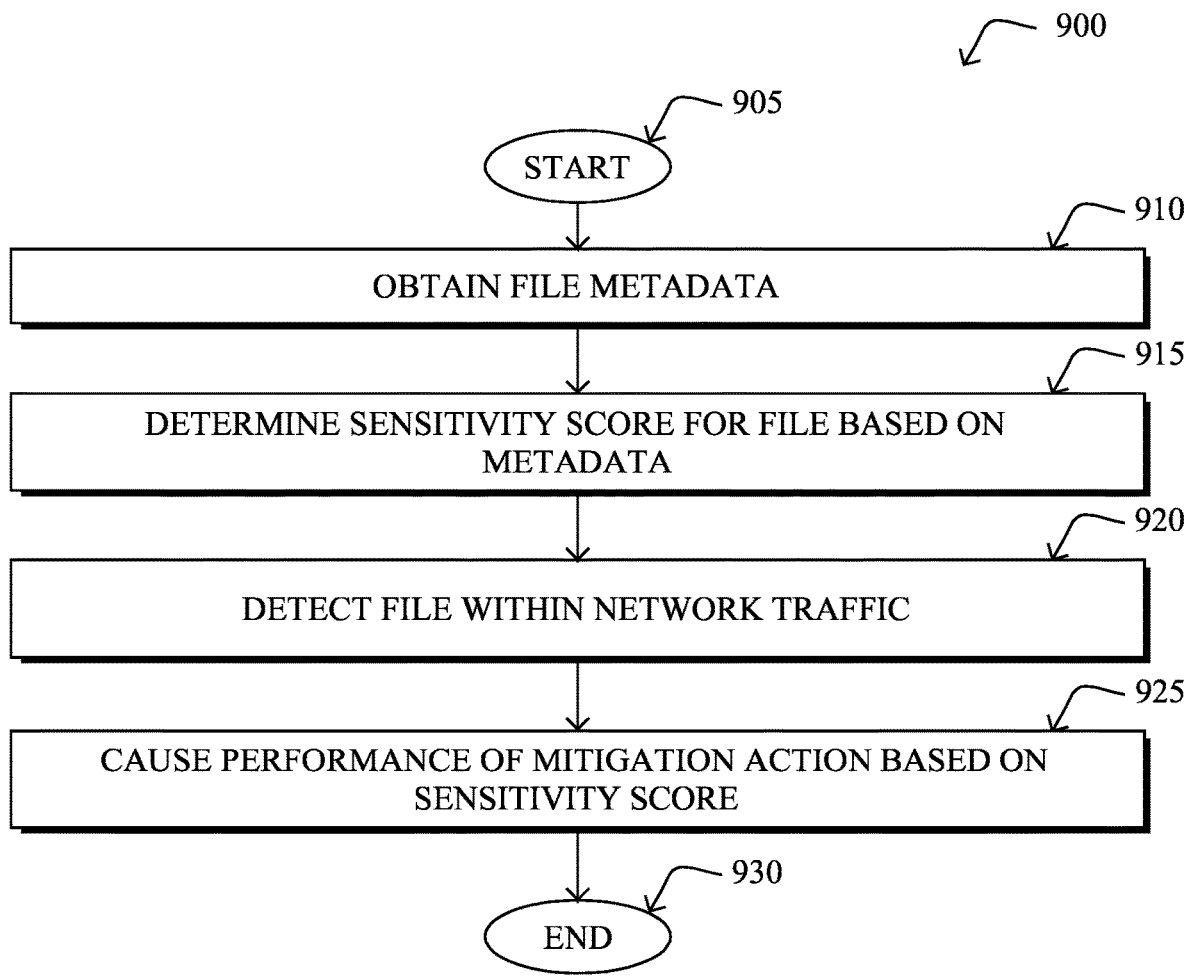
FIG. 9 illustrates an example simplified procedure for inferring the sensitivity of an electronic file in a file movement tracking system.

FIG. 9 illustrates an example simplified procedure for inferring the sensitivity of an electronic file in a file movement tracking system in a network, in accordance with one or more embodiments described herein. For example, a non-generic, specifically configured device (e.g., device 200) may perform procedure 900 by executing stored instructions (e.g., process 248), to provide a traffic analysis service to a network, such as a file tracking service. The procedure 900 may start at step 905, and continues to step 910, where, as described in greater detail above, the service may obtain file metadata regarding an electronic file. Such metadata may include, but is not limited to, information regarding the file path, file name, author, file size, file hash, hosting endpoint, endpoint user, frequency of occurrence across endpoints, hosting endpoint malware status, or the like. For example, the service may receive the metadata from a monitoring agent executed by the endpoint(s) hosting the file, a user profile service, or any other suitable data source.

At step 915, as detailed above, the service may determine a sensitivity score for the electronic file based on the file metadata. In some embodiments, the sensitivity score may be based in part on weights applied to the words found within the file path or file name associated with the file. Such word weights may be determined according to their frequency of use across endpoints and/or any prior knowledge regarding their influence on the file sensitivity (e.g., 'Confidential' in the file name or file path may be strong indicator that the file is sensitive). In further embodiments, the sensitivity score of the file may also be increased based on whether the endpoint hosting the file has been identified as being infected with malware. In yet further embodiments, the sensitivity score may be based in part on user profile information associated with the file and/or the prevalence of the file across other endpoints. For example, a given file that exists only on a high ranking person's computer, or only among a certain set of individual's computers, may receive a higher sensitivity score than a file that is commonly found across computers in the network. In yet further embodiments, the sensitivity score can be assigned by using the metadata associated with the file as input to a machine learning-based classifier that has been trained to label a file with a sensitivity score.

At step 920, the service may detect the electronic file within traffic in the network, as described in greater detail above. When the traffic is unencrypted, the file detection can be achieved using techniques such as deep packet inspection (DPI) or similar payload inspection technique. In further embodiments, the techniques detailed above, can also be leveraged to detect the file within encrypted traffic, by matching the inferred file size from the encrypted traffic to a file size obtained from a monitoring agent on the endpoint.

At step 925, as detailed above, the service may cause the performance of a mitigation action regarding the detection of the electronic file within the traffic, based on the sensitivity score of the electronic file. For example, if the service assigns a high sensitivity score to the file, and the file is being sent to an external destination outside of the network, the service may generate an alert regarding the transmission and send the alert to a user interface for review. In further embodiments, more severe mitigation actions can also be taken, such as blocking the transmission, preventing further traffic from the endpoint, or the like. Procedure 900 then ends at step 930.

It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for unstructured data sensitivity inference for file movement tracking in a network, it is to be understood that various other adaptations and modifications may be made within the spirit and scope of the embodiments herein. For example, while certain embodiments are described herein with respect to using certain models for purposes of assigning a sensitivity score to a file, the models are not limited as such and may be used for other functions, in other embodiments. In addition, while certain protocols are shown, such as TLS, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   obtaining, by a traffic analysis service that monitors a network, file metadata regarding an electronic file, the file metadata comprising an indication of a file size of the electronic file;
   determining, by the traffic analysis service, a sensitivity score for the electronic file based on the file metadata, wherein the sensitivity score is indicative of a probability of the electronic file containing sensitive or protected information;
   detecting, by the traffic analysis service and based at least on the file size as indicated by the file metadata, the electronic file within encrypted traffic in the network without decrypting the encrypted traffic; and
   in response to detecting the electronic file within the encrypted traffic, causing, by the traffic analysis service, performance of a mitigation action based on the sensitivity score of the electronic file.

2. The method as in claim 1, wherein the mitigation action comprises sending an alert to a user interface that identifies the electronic file and a sender of the encrypted traffic.

3. The method as in claim 1, wherein detecting the electronic file within the encrypted traffic in the network without decrypting the encrypted traffic comprises:
   receiving file size information of the electronic file from an agent executed by an endpoint on which the electronic file is hosted; and
   comparing the file size information received from the agent executed by the endpoint to the file size as indicated by the file metadata.

4. The method as in claim 1, wherein the file metadata further comprises user profile information associated with the electronic file, and wherein the sensitivity score is determined further based on the user profile information.

5. The method as in claim 1, wherein the sensitivity score is determined based further on a frequency of the electronic file appearing on endpoints across at least a portion of the network.

6. The method as in claim 1, wherein the file metadata further comprises a file name or file path, and wherein determining the sensitivity score for the electronic file comprises:
   matching one or more words that appear in the file name or file path of the electronic file to words appearing in file names or file paths of a plurality of electronic files; and
   calculating the sensitivity score for the electronic file based in part on frequencies of the one or more words that are matched to the words appearing in the file names or file paths of the plurality of electronic files.

7. The method as in claim 1, wherein the sensitivity score for the electronic file is determined based further on whether malware was detected on an endpoint on which the electronic file is hosted.

8. The method as in claim 1, wherein obtaining the file metadata regarding the electronic file comprises:
   receiving, at the traffic analysis service, the file metadata from an agent executed by an endpoint on which the electronic file is hosted.

9. An apparatus, comprising:
   one or more network interfaces to communicate with a network;
   a processor coupled to the one or more network interfaces and configured to execute one or more processes; and
   a memory configured to store a process that is executable by the processor, the process when executed configured to:
      obtain file metadata regarding an electronic file, the file metadata comprising an indication of a file size of the electronic file;
      determine a sensitivity score for the electronic file based on the file metadata, wherein the sensitivity score is indicative of a probability of the electronic file containing sensitive or protected information;
      detect, based at least on the file size as indicated by the file metadata, the electronic file within encrypted traffic in the network without decrypting the encrypted traffic; and
      in response to detecting the electronic file within the encrypted traffic, cause performance of a mitigation action based on the sensitivity score of the electronic file.

10. The apparatus as in claim 9, wherein the mitigation action comprises sending an alert to a user interface that identifies the electronic file and a sender of the encrypted traffic.

11. The apparatus as in claim 9, wherein the apparatus detects the electronic file within the encrypted traffic in the network without decrypting the encrypted traffic by:
   receiving file size information of the electronic file from an agent executed by an endpoint on which the electronic file is hosted; and
   comparing the file size information received from the agent executed by the endpoint to the file size as indicated by the file metadata.

12. The apparatus as in claim 9, wherein the file metadata further comprises user profile information associated with the electronic file, and wherein the sensitivity score is determined further based on the user profile information.

13. The apparatus as in claim 9, wherein the sensitivity score is determined based further on a frequency of the electronic file appearing on endpoints across at least a portion of the network.

14. The apparatus as in claim 9, wherein the file metadata further comprises a file name or file path, and wherein the apparatus determines the sensitivity score for the electronic file by:
   matching one or more words that appear in the file name or file path of the electronic file to words appearing in file names or file paths of a plurality of electronic files; and
   calculating the sensitivity score for the electronic file based in part on frequencies of the one or more words that are matched to the words appearing in the file names or file paths of the plurality of electronic files.

15. The apparatus as in claim 9, wherein the sensitivity score for the electronic file is determined based further on whether malware was detected on an endpoint on which the electronic file is hosted.

16. The apparatus as in claim 9, wherein the apparatus obtains the file metadata regarding the electronic file by:
   receiving the file metadata from an agent executed by an endpoint on which the electronic file is hosted.

17. A tangible, non-transitory, computer-readable medium that stores program instructions that cause a traffic analysis service that monitors a network to execute a process comprising:
   obtaining, by the traffic analysis service, file metadata regarding an electronic file, the file metadata comprising an indication of a file size of the electronic file;
   determining, by the traffic analysis service, a sensitivity score for the electronic file based on the file metadata, wherein the sensitivity score is indicative of a probability of the electronic file containing sensitive or protected information;
   detecting, by the traffic analysis service and based at least on the file size as indicated by the file metadata, the electronic file within encrypted traffic in the network without decrypting the encrypted traffic; and
   in response to detecting the electronic file within the encrypted traffic, causing, by the traffic analysis service, performance of a mitigation action based on the sensitivity score of the electronic file.

18. The tangible, non-transitory, computer-readable medium as in claim 17, wherein the mitigation action comprises sending an alert to a user interface that identifies the electronic file and a sender of the encrypted traffic.

19. The tangible, non-transitory, computer-readable medium as in claim 17, wherein detecting the electronic file within the encrypted traffic in the network without decrypting the encrypted traffic comprises:
   receiving file size information of the electronic file from an agent executed by an endpoint on which the electronic file is hosted; and
   comparing the file size information received from the agent executed by the endpoint to the file size as indicated by the file metadata.

20. The tangible, non-transitory, computer-readable medium as in claim 17, wherein the file metadata further comprises user profile information associated with the electronic file, and wherein the sensitivity score is determined further based on the user profile information.

* * * * *